United States Patent
Akutsu et al.

(10) Patent No.: US 8,382,156 B2
(45) Date of Patent: Feb. 26, 2013

(54) IMPACT ABSORBING STEERING APPARATUS

(75) Inventors: Naoto Akutsu, Gunma (JP); Makoto Nagasawa, Gunma (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 13/256,692

(22) PCT Filed: Jul. 25, 2011

(86) PCT No.: PCT/JP2011/066879
§ 371 (c)(1),
(2), (4) Date: Feb. 28, 2012

(87) PCT Pub. No.: WO2012/026257
PCT Pub. Date: Mar. 1, 2012

(65) Prior Publication Data
US 2012/0193902 A1    Aug. 2, 2012

(30) Foreign Application Priority Data
Aug. 24, 2010 (JP) ................................. 2010-187525

(51) Int. Cl.
*B62D 1/11* (2006.01)
(52) U.S. Cl. ...................................... 280/777
(58) Field of Classification Search .................. 280/777, 280/779; 74/492, 493
See application file for complete search history.

(56) References Cited

U.S. PATENT DOCUMENTS
5,961,146 A * 10/1999 Matsumoto et al. .......... 280/777
2009/0090210 A1* 4/2009 Menjak et al. .................. 74/492

FOREIGN PATENT DOCUMENTS
| JP | 09-024843 | 1/1997 |
| JP | 09-272448 | 10/1997 |
| JP | 10-167083 | 6/1998 |
| JP | 2004-074985 | 11/2004 |

* cited by examiner

*Primary Examiner* — Paul N Dickson
*Assistant Examiner* — Robert A Coker
(74) *Attorney, Agent, or Firm* — Hartman Global IP Law; Gary M. Hartman; Domenica N. S. Hartman

(57) ABSTRACT

Construction is achieved wherein a steering wheel can displace smoothly in the forward direction during a secondary collision, even when an electric motor 13a of an electric power steering apparatus protrudes to the side.

Members are located between a pair of left and right installation plate sections 17c, which are provided on a bracket 10c on the column side that is supported by a steering column 6c, and a portion that is fastened to the vehicle body, and connected and fastened to both of these; and by making the rigidity or friction coefficient of these members different from each other, the load required for the installation plate sections 17c to drop away toward the front from the portion fastened to the vehicle body is made to be large on the side far from the electric motor 13a and less on the side near to the electric motor 13a. Therefore, the tendency for the dropping away toward the front on the side where the electric motor 13, having a large inertial mass, is located, being difficult, is cancelled out by the ease of the dropping away of the installation plate section 17a.

11 Claims, 20 Drawing Sheets

IMPACT ABSORBING STEERING APPARATUS

CROSS REFERENCE TO RELATED APPLICATIONS

This application claims the benefit of International Application No. PCT/JP2011/066879 filed Jul. 25, 2011, having a claim of priority to JP patent application number 2010-187525 filed Aug. 24, 2010.

TECHNICAL FIELD

The present invention relates to an impact absorbing steering apparatus that is capable of absorbing impact energy that is applied to a steering wheel from the body of a driver during a collision accident, while the steering wheel displaces in the forward direction, and particularly to an impact absorbing steering apparatus having construction wherein an electric motor of an electric power steering apparatus is provided in a state protruding toward the side in a portion that displaces in the forward direction together with the steering wheel.

BACKGROUND ART

As illustrated in FIG. 9, the steering apparatus of an automobile is constructed such that it applies a steering angle to the front wheels by transmitting the rotation of a steering wheel 1 to an input shaft 3 of a steering gear unit 2, and pushing or pulling a pair of left and right tie rods 4 as the input shaft 3 rotates. The steering wheel 1 is supported by and fastened to the rear end section of a steering shaft 5, and with the steering shaft 5 passed in the axial direction through a cylindrical shaped steering column 6, the steering shaft 5 is supported by this steering column 6 such that it can rotate freely. The front end section of the steering shaft 5 is connected to the rear end section of an intermediate shaft 8 via a universal joint 7, and the front end section of the intermediate shaft 8 is connected to the input shaft 3 via a separate universal joint 9. The intermediate shaft 8 is constructed such that it is capable of transmitting torque, and such that its entire length can be contracted by an impact load. During a collision accident, regardless of backward displacement of the steering gear unit 2, due to contraction of the intermediate shaft 8, the steering wheel 1 is prevented from displacing toward the rear with the steering shaft 5 and thus from being pressed up against the body of the driver.

During a collision accident, it is required for this kind of steering wheel apparatus for an automobile to have construction that causes the steering wheel 1 to displace in the forward direction as it absorbs impact energy so as to protect the driver. In other words, during a collision accident, after a primary collision of an automobile with another automobile, a secondary collision occurs in which the body of the driver hits the steering wheel 1. Technology has been conventionally employed in which the impact applied to the body of the driver during this secondary collision is lessened by supporting the steering column 6 that supports the steering wheel 1 with respect to the vehicle body so that the steering column 6 drops away toward the front due to the impact load of this secondary collision, and by providing an energy absorbing member, which absorbs an impact load by deforming plastically, between a portion that displaces in the forward direction together with the steering column 6 and the vehicle body.

FIGS. 10 to 13 illustrate an example of an automobile steering apparatus that comprises this kind of impact absorbing function. This steering apparatus comprises a steering column 6a, a bracket 10 on the column side, a pair of left and right held wall sections 11 that are provided on the steering column 6a side, and a bracket 12 on the vehicle body side. A steering shaft 5a is supported on the inner-diameter side of the steering column 6a by way of a rolling bearing that is capable of supporting a radial load and a thrust load such that the steering shaft 5a can only rotate freely. A housing 14 for installing the component members of an electric power steering apparatus such as an electric motor 13 (see FIG. 9) and reduction gear, is connected and fastened to the front end section of the steering column 6a.

Moreover, the bracket 10 on the column side is connected to and supported by the bracket 12 on the vehicle body side such that the bracket 10 can displace in the forward direction and detach due to an impact load that is applied during a secondary collision. The bracket 10 on the column side is formed by connecting and fastening together a top plate 15 and a pair of left and right side plates 16a, 16b, which are metal plates having sufficient strength and rigidity such as steel plate, by a method such as welding. Both end sections in the width direction of the top plate 15 functions as installation plate sections 17 for connecting the bracket 10 on the column side to and supporting it by the bracket 12 on the vehicle body side. Cut out sections 18 as illustrated in FIG. 13 are opened at the rear end edge of these installation plate sections 17 in the center section in the width direction of these installation plate sections 17, and capsules 19 are respectively mounted in these cut out sections 18.

The capsules 19 are made of a material that slides easily over the metal plate of the top plate 15 such as a synthetic resin or a soft metal including an aluminum alloy. The capsules 19, in the normal state, do not come out from the cut out sections 18, however when a large impact load is applied to the bracket 10 on the column side in the forward direction, members for locking the capsules 19 inside the cut out sections 18 shear, and the capsules 19 come out from the cut out sections 18. More specifically, shear pins span between the concave sections 20 and small through holes 21 that are formed in the inner circumferential edge or surrounding portion around the cut out sections 18 in the installation plate sections 17, and other small through holes 22 that are formed in the capsules 19. These shear pins are formed using a material that can shear under an impact load such as a synthetic resin or a soft metal, and with at least part of each of the pins being tightly pressure fitted inside the small through 21, 22, the pins span between the installation plate sections 17 and the capsules 19, and thus the capsules 19 are supported by these installation plate sections 17.

Through holes 23 are formed in the center section of the capsules 19 for inserting bolts or studs for connecting the bracket 10 on the column side to and supporting the bracket 10 by the bracket 12 on the vehicle side. In order to connect the bracket 10 on the column side to and supporting the bracket 10 by the bracket 12 on the vehicle side, the bolts are inserted from bottom to top through the through holes 23 in the capsules 19, and screwed into nuts 24 that are supported by and fastened to the bracket 12 on the vehicle side by welding or the like, and tightened. This bracket 12 on the vehicle side is fastened to the vehicle body beforehand, so by tightening the bolts, the bracket 10 on the column side is connected to and supported by the vehicle body so that it can only drop toward the front when a large impact load is applied in the forward direction.

The steering column 6a is supported between the side plates 16a, 16b of the bracket 10 on the column side. The steering column 6a is supported to the bracket 10 on the column side such that the steering column 6a are displaced in the forward direction together with the bracket 10 on the column side, and the steering shaft 5a is supported by the steering column 6a such that the steering shaft 5a can only rotate freely. Therefore, in a secondary collision, when an impact load is applied in the forward direction to the steering wheel 1 that is fastened to the steering shaft 5a, the steering column 6a disengages from the bracket 10 on the column side, and displaces in the forward direction together with the steering wheel 1.

When a large impact load in the forward direction is applied from the steering wheel 1 to the bracket 10 on the column side during a secondary collision, the shear pins that span between the capsules 19 and the installation plate sections 17 shear off, and the capsules 19 come out from the cut out sections 18, and the bracket 10 on the column side displaces in the forward direction. As a result, the steering wheel 1 also displaces in the forward direction, which lessens the impact applied to the body of the driver that hits against the steering wheel 1.

From the aspect of protecting the driver, when the steering wheel 1 is caused to displace in the forward direction during a secondary collision, it is further desired that a mechanism be provided that absorbs the impact energy that is applied to the steering wheel 1 from the body of the driver. For example, even in the construction illustrated in FIG. 9 to FIG. 13, a friction force acts on the areas of contact between the outside surfaces of the held wall sections 11 and the inside surfaces of the side plates 16a, 16b, and a friction force acts on the area of contact between the inner circumferential surface on the front section of the outer column and the outer circumferential surface on the rear end of the inner column, and this becomes resistance to the displacement of the steering wheel 1 in the forward direction, and contributes to absorbing impact energy.

Furthermore, construction is disclosed in Patent Literatures 1 to 3, wherein an energy absorbing member, which allows the steering column to displace in the forward direction while plastically deforming, is supported by the vehicle body and is located between a portion that displaces in the forward direction during a secondary collision and a portion that does not displace in the forward direction during a secondary collision. FIGS. 14 to 16 illustrate a first example of conventional construction as disclosed in Patent Literature 1 in which an energy absorbing member is installed. In the case of this first example of conventional construction, a metal plate that is capable of plastic deformation, such as mild steel plate, and that is bent into the shape illustrated in FIG. 15 is used as the energy absorbing member 25. The rear section of the energy absorbing member 25 is connected to the bracket 12a on the vehicle side together with the pair of left and right installation plate sections 17a that are provided on the bracket 10a on the column side by a bolt 26. U-shaped cut out sections, for example, are formed on the installation plate sections 17a with opened at the rear end edge thereof, and the bolt 26 is inserted though the cut out sections. The front section of the energy absorbing member 25 is bent back in a U shape, and as illustrated in FIG. 14, the edge of the tip end is fitted with part of the installation plate sections 17a, such that during a secondary collision, this edge on the tip end displaces in the forward direction together with the bracket 10a on the column side.

As illustrated in FIG. 16, when a secondary collision occurs, the bracket 10a on the column side displaces in the forward direction while the bolt 26 comes out from the cut out section toward the rear. However, the rear section of the energy absorbing member 25 is supported by the bolt 26, and remains on the portion of the bracket 12a in the vehicle body side. Therefore, the energy absorbing member 25 elongates due to plastic deformation from the state illustrated in FIG. 14 to the state illustrated in FIG. 16. Due to this elongation, impact energy that is applied to the steering wheel 1 during a secondary collision is absorbed, which lessens the impact that is applied to the body of the driver that hit against the steering wheel. Patent Literature 3 also discloses construction similar to that disclosed in Patent Literature 1, wherein an energy absorbing member made using a metal plate is installed.

FIGS. 17 to 19 illustrate a second example of conventional construction as disclosed in Patent Literature 2, wherein an energy absorbing member is installed. In the case of this second example of conventional construction, wires made of metal that is capable of plastic deformation such as mild steel and that are bent into the shapes illustrated in FIG. 18 are used as a pair of energy absorbing members 25a. The bent back base section 27 of the energy absorbing member 25a is fastened to the rear side of the capsule 19a which is supported by the bracket on the vehicle side and does not displace in the forward direction even during a secondary collision. On the other hand, the bent back section 28 on the front end side of the energy absorbing member 25a faces the front end edge of the installation plate section 17b of the bracket 10b on the column side. Furthermore, the straight section 29 that is continuous from the bent back section 28 on the front end side toward both end sections of the wire member passes through a through hole 31 that is formed in the flat plate section 30 of the bracket 10b on the column side is caused to protrude to the rear further than the flat plate section 30.

When a secondary collision occurs, as the steering column 6b to which the bracket 10b on the column side is fastened displaces in the forward direction, the front end edge of the installation plate section 17b engages with and moves the bent back section 28 on the front end of the energy absorbing member 25a. The straight section 29 comes out from the through hole 31, and the bent back section 28 on the front end side is caused to move toward both end sections of the wire. The movement of these bent back sections 28 on the front end sides is performed as plastic deformation of these wire members, so this movement absorbs the impact energy that is applied to the steering wheel during a secondary collision, which lessens the impact applied to the body of the driver that hit against the steering wheel.

RELATED LITERATURE

Patent Literature

[Patent Literature 1] Japanese Patent Application Publication No. H09-24843
[Patent Literature 2] Japanese Patent Application Publication No. H09-272448
[Patent Literature 3] Japanese Patent Application Publication No. H 10-167083
[Patent Literature 4] Japanese Patent Application Publication No. 2004-74985

SUMMARY OF THE INVENTION

Problem to be Solved by the Invention

In this kind of impact absorbing steering apparatus, in any construction, in order to completely protect the driver, it is necessary that displacement of the steering column in the forward direction be performed smoothly. However, as disclosed in Patent Literature 4, in the case of construction wherein an electric motor is caused to protrude to one side from a housing for an electric power steering apparatus that is fastened to the front end section of the steering column, it was found through investigation by the inventors that displacement in the forward direction of the steering column during a secondary collision is not always performed smoothly due to the existence of the electric motor.

Therefore, the object of the present invention is to provide construction where in the steering wheel can displace smoothly in the forward direction even in the case of construction wherein the electric motor of an electric power steering apparatus protrudes to the side.

Means for Solving the Problems

An impact absorbing steering apparatus of the present invention comprises:

a steering column;

a steering shaft that is supported on the inside of the steering column such that it rotates freely, and is capable of supporting and fastening to a steering wheel on the rear end section that protrudes from the opening on the rear end of the steering column;

a bracket on the column side that comprises a pair of installation plate sections that protrude toward both the left and right sides of the steering column and that are supported by a portion that is fastened to a vehicle body such that these installation plate sections drop away toward the front due to an impact load in the forward direction, and is supported by the steering column and supported by the vehicle body such that displacement in the axial direction together with the steering column is possible; and an electric power steering apparatus that comprises a housing that is supported by the front end section of the steering column, and an electric motor that protrudes to one side from this housing, and that, with this electric motor as a power source, applies an auxiliary torque for the rotation of the steering shaft.

Particularly, the impact absorbing steering apparatus of the present invention is constructed such that the load required for the pair of installation plate sections to drop away toward the front from the portion fastened to the vehicle body is smaller for the installation plate section on the side near the electric motor than for the installation plate section on the side far from the electric motor.

More specifically, in the impact absorbing steering apparatus of the present invention there are members that are located between the installation plate sections and a portion that is fastened to the vehicle body, and that are connected and fastened to both of these; the rigidity or the friction coefficient of these members being different on the side that is far from the electric motor and the side that is near the electric motor.

In a first embodiment of the impact absorbing steering apparatus of the present invention, there is a pair of energy absorbing members provided between the installation plate sections and a portion fastened to the vehicle body, each of the members formed by bending a plastically deformable metal plate and having a plastically deforming section that deforms when the installation plate sections drop away toward the front, allowing these installation plate sections to displace in the forward direction; wherein the rigidity of these energy absorbing members is less for the energy absorbing member on the side near the electric motor than for the energy absorbing member on the side far from the electric motor.

More specifically, the width dimension of the plastically deforming sections of these energy absorbing members is less for the energy absorbing member on the side near the electric motor than for the energy absorbing member on the side far from the electric motor. Alternatively, the thickness dimension of the plastically deforming sections of these energy absorbing members is less for the energy absorbing member on the side near the electric motor than for the energy absorbing member on the side far from the electric motor.

In a second embodiment of the impact steering apparatus of the present invention, the installation plate sections comprise cut out sections that open to the rear end edges of the installation plate sections;

the portion fastened to the vehicle body comprises capsules that are supported by this portion such that the displacement in the forward direction is prevented even when an impact load is applied to this portion, and that are fastened to the installation plate sections with arranged inside the respective cut out sections such that they can come out from the cut out sections toward the rear when an impact load is applied to these installation plate sections;

there is a pair of energy absorbing members that are located between the capsules and the installation plate sections, and that are each formed by bending plastically deformable wires such that these wires elongate when an impact load is applied to the installation plate sections, allowing the installation plate sections to displace in the forward direction; and the rigidity of the wires of these energy absorbing members is such that the rigidity of the wire on the side near the electric motor is less than the rigidity of the wire on the side far from the electric motor. More specifically, the diameter of the wires of these energy absorbing members is such that the wire on the side near the electric motor is thinner than the wire on the side far from the electric motor.

In a third embodiment of the impact absorbing steering apparatus of the present invention, the installation plate sections comprise cut out sections that open to the rear end edges of these installation plate sections, and locking sections on the displacing side;

the portion fastened to the vehicle body comprise capsules that are provided with locking sections on the fastened side and that are supported by this portion with arranged inside the respective cut out sections such that the displacement in the forward direction is prevented even when an impact load is applied to this portion;

there are shear pins that span between the locking sections on the displacing side and the locking sections on the fastened side, and these shear pins lock the capsules to the installation plate sections such that the capsules are capable of coming out from the cut out sections toward the rear when an impact load is applied to these installation plate sections; and the rigidity of these shear pins is such that the rigidity of the shear pins on the side near the electric motor is less than the rigidity of the shear pins on the side far from the electric motor. More specifically, the shear pins on the side near the electric motor shear more easily than the shear pins on the side far from the electric motor.

For example, it is possible for the diameter of the shear pins on the side near the electric motor to be less than the diameter of the shear pins on the side far from the electric motor, or for the shearing resistance of the material of the shear pins on the side near the electric motor to be less than the shearing resistance of the material of the shear pins on the side far from the electric motor.

In a fourth embodiment of the impact absorbing steering apparatus of the present invention, between both the top and bottom surfaces of the installation plate sections, and the bottom surface of the portion fastened to the vehicle body and the top surface of a restraining member that presses the installation plate sections to the portion fastened to the vehicle body, there is a pair of sliding plates for reducing the friction required for causing these surfaces facing to each other to displace, and the friction coefficient of the sliding plate that is on the side near the electric motor is less than the friction coefficient of the sliding plate that is on the side far from the electric motor.

Preferably, in any of the embodiments of the present invention, the impact absorbing steering apparatus further comprises: a pair of front side installation plate sections that protrude toward the both the left and right of the steering column, and that are supported by a portion that is fastened to the vehicle body such that these front side installation plate sections can drop away toward the front due to an impact load that is applied in the forward direction; and a bracket on the housing side that is supported by the housing, and together with this housing is supported by the vehicle body such that the displacement in the axial direction is possible; wherein the load required for the front side installation plate sections to drop away from the portion fastened to the vehicle body is less on the side near the electric motor than the side far from the electric motor. In this case as well, preferably there are members that are located between the front side installation plate sections and the portion that is fastened to the vehicle body, and are connected and fastened to both of these, wherein the rigidity or friction coefficient of these members is different between the side far from the electric motor and on the side near the electric motor.

Effect of the Invention

With the impact absorbing steering apparatus of the present invention having an electric power steering apparatus as described above, the steering wheel is caused to displace smoothly in the forward direction even when the electric motor of the electric power steering apparatus protrudes from the side. In other words, an installation plate section that is located on the side of an electric motor with a large inertia mass and that does not displace easily in the forward direction during a secondary collision due to the existence of the electric motor, drops away toward the front more easily than the installation plate section on the opposite side. Therefore, difficulty in displacement in the forward direction on the side where the electric motor is located due to the existence of the electric motor is cancelled out by the ease that the installation plate section drops away, and the steering column where the installation plate sections are located displaces smoothly in the axial direction thereof. As a result, sliding in a plurality of areas of friction engagement, and plastic deformation of energy absorbing members that are provided between the vehicle body and the steering column, are effectively performed from the aspect of impact energy absorption, and thus it becomes easier to more completely protect the driver.

BRIEF DESCRIPTION OF THE DRAWINGS

FIG. 20A is a top view illustrating the normal state of an impact absorbing steering apparatus comprising an electric power steering apparatus, and FIG. 20B illustrates the state after a secondary collision.

BEST MODES FOR CARRYING OUT THE INVENTION

As described above, in a conventional impact absorbing steering apparatus, in any construction, when an electric motor is caused to protrude to one side from a housing for an electric power steering apparatus that is fastened to the front end section of the steering column, it was found through investigation by the inventors that displacement in the forward direction of the steering column during a secondary collision is not always performed smoothly due to the existence of the electric motor. The reason for this is explained with reference to FIG. 20.

Figure 20:
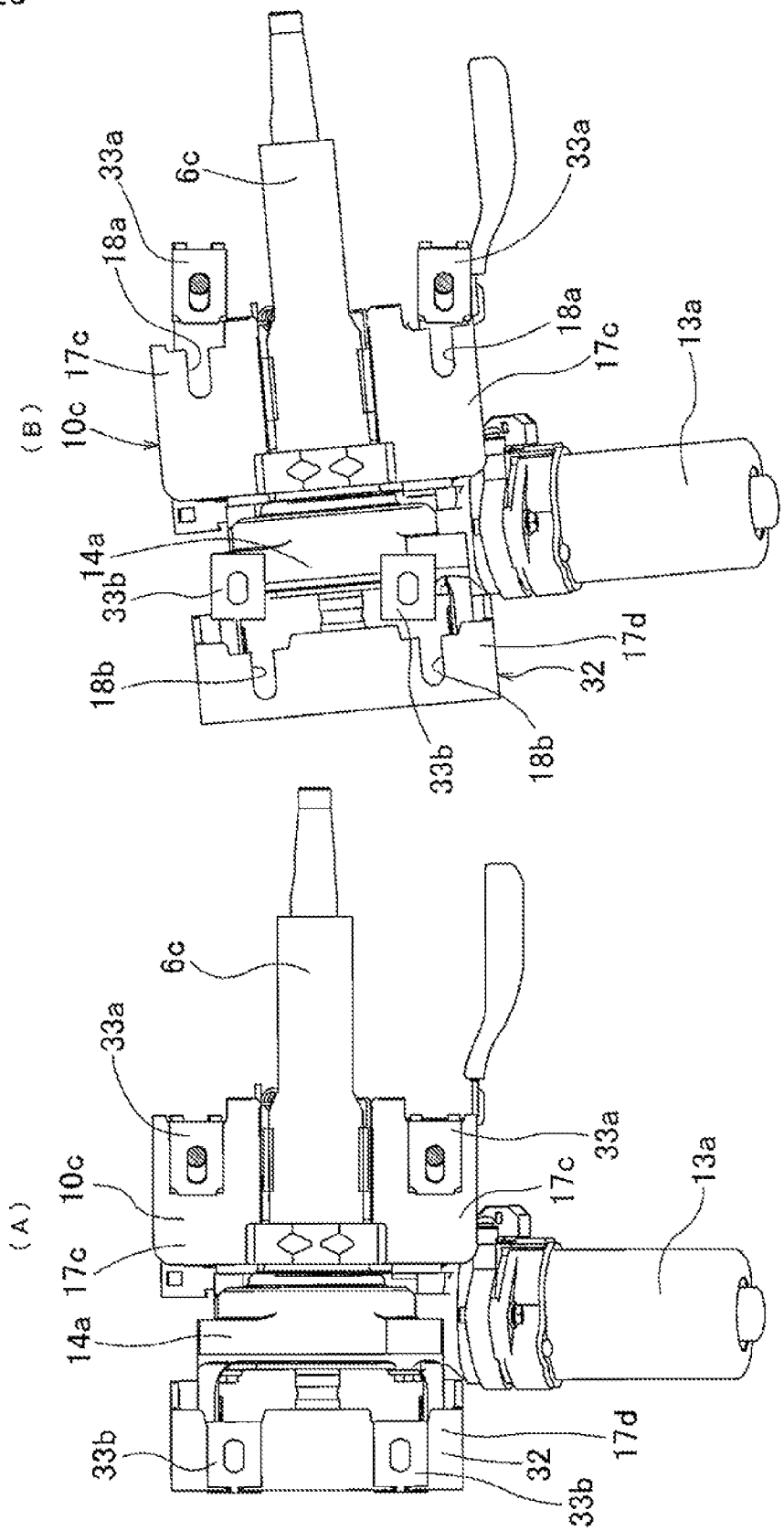
FIGS. 20A and 20B are drawings for explaining the reason that the steering column is inclined during a secondary collision by installed condition of an electric motor, where

FIG. 20 illustrates an impact absorbing steering apparatus comprising an electric power steering apparatus as seen from above. A housing 14a that houses the component parts such as the reduction gear of an electric power steering apparatus is fastened to the front end section of a steering column 6c, and this steering column 6c and housing 14a are supported by the bracket on the vehicle body side such that they are capable of dropping away in the forward direction due an impact load in the forward direction. In order for this, a bracket 10c on the column side that is supported in the middle section of the steering column 6c, and a bracket 32 on the housing side that is supported by the housing 14a are supported by the vehicle body such that they drop away in the forward direction due to an impact load to either in the forward direction. These brackets 10c, 32 both comprise a pair of left and right, or a left and right integrated installation plate sections 17c, 17d, and cut out sections 18a, 18b that are opened at the rear end edge of the installation plate sections 17c, 17d are formed in these installation plate sections 17c, 17d. With these cut out sections 18a, 18b covered, sliding plates 33a, 33b are installed on both the left and right end sections of the brackets 10c, 32. Then left and right end sections of these brackets 10c, 32 are supported by the vehicle body by bolts or studs that are inserted through the through holes that are formed in these brackets 10c, 32.

During a secondary collision, the bolts or studs come out from the cut out sections 18a, 18b together with the sliding plates 33a, 33b, which allows the steering column 6c and housing 14a to displace in the forward direction. In this case, when these members 6a, 14a displace along the axial direction of the steering column 6c, they drop away in the forward direction and displace smoothly, so the impact applied to the body of the driver that hit against the steering wheel is effectively lessened. However, in the case of the construction illustrated in FIG. 20, the electric motor 13a that becomes an auxiliary power source for the electric power steering apparatus has a large weight and large inertial mass, and in the case of construction in which this electric motor 13a protrudes to one side of the housing 14a, there is a tendency during a secondary collision for the housing 14 to which the electric motor 13a is fastened and supported by to become inclined with respect to the axial direction.

In other words, for the electric motor 13a having a large inertial mass, the start of displacement when an impact load is received during a secondary collision has a tendency to be delayed when compared with other parts that have a relative small inertial mass. As a result, during a secondary collision, the steering column 6c and the housing 14a displace in the forward direction with the side of the electric motor 13a inclined as is toward the rear more than the side opposite from the electric motor 13a as illustrated in FIGS. 20A and 20B. This kind of displacement toward the front is performed as the friction fit at a plurality of locations is caused to slide, and the energy absorbing member provided between the vehicle side and the steering column 6c or housing 14a side is caused to plastically deform. Sliding of the areas of friction fit and the plastic deformation of the energy absorbing member are designed to be effectively performed when the steering column 6c and housing 14a displace in the axial direction of the steering column 6c. On the other hand, as illustrated in FIGS. 20A and 20B, displacement of the steering wheel 6c and housing 14a in the forward direction in an inclined state is not advantageous from the aspect of completely protecting the driver.

The present invention was developed based on this kind of knowledge. The embodiments of the present invention will be explained in detail with reference to the drawings. However, the present invention is not limited to these embodiments.

First Example of Embodiment 1

FIGS. 1 to 4 illustrate a first example of a first embodiment of the present invention. Similar to the construction illustrated in FIG. 20, a housing 14a that houses component parts such as the reduction gear of an electric power steering apparatus is fastened to the front end section of a steering column 6c. Moreover, an electric motor 13a that will function as an auxiliary power source for the electric power steering apparatus is supported by and fastened to the surface on one side of the housing 14a. Furthermore, the steering column 6c and housing 14a are supported by a bracket on the vehicle side so that they drop away toward the front due to an impact load in the forward direction.

In order for this, a bracket 10c on the column side that is supported in the middle section of the steering column 6c and a bracket 32 on the housing side that is supported by the housing 14a are supported by the vehicle body such that they will both drop away toward the front due to an impact load in the forward direction. These brackets 10c, 32 both comprise a pair of left and right, or a pair of integrated left and right installation plate sections 17c, 17d, and cut out sections 18a, 18b are formed in these installation plate sections 17c, 17d such the cut out sections 18a, 18b are opened at the rear end edge of these installation plate sections 17c, 17d. With these cut out sections 18a, 18b covered, sliding plates 33a, 33b are installed on both the left and right end sections of the brackets 10c, 32. These sliding plates 33a, 33b are formed into a long U shape with the front opened up by injection molding of synthetic resin, for example, or by bending a metal plate on which a synthetic resin coating layer is formed on the surfaces, and are respectively provided with top and bottom plate portions, a connection plate sections that connect the rear end edges of these plate sections, and through holes are formed in the portions of these plate sections that are aligned with each other. Restraining pieces may be formed on the tip end edges of one or both of these plate sections in order to keep the sliding plates 33a, 33b from coming apart from the installation plate sections 17c, 17d due to engagement to the front end edge of the installation plate sections 17c, 17d. The installation plate sections 17c, 17d of the brackets 10c, 32 are supported by the vehicle body by bolts 34 that are inserted through the cut out sections 18a, 18b of the installation plate sections 17c, 17d and through holes that are formed in the sliding plates 33a, 33b. The installation plate sections 17c, 17d do not necessarily need to be separate left and right sections, and as mentioned above, construction in which both ends of an integrated installation plate protrude in both the left and right directions of the steering column is included in this pair of installation plate sections.

Figure 14:
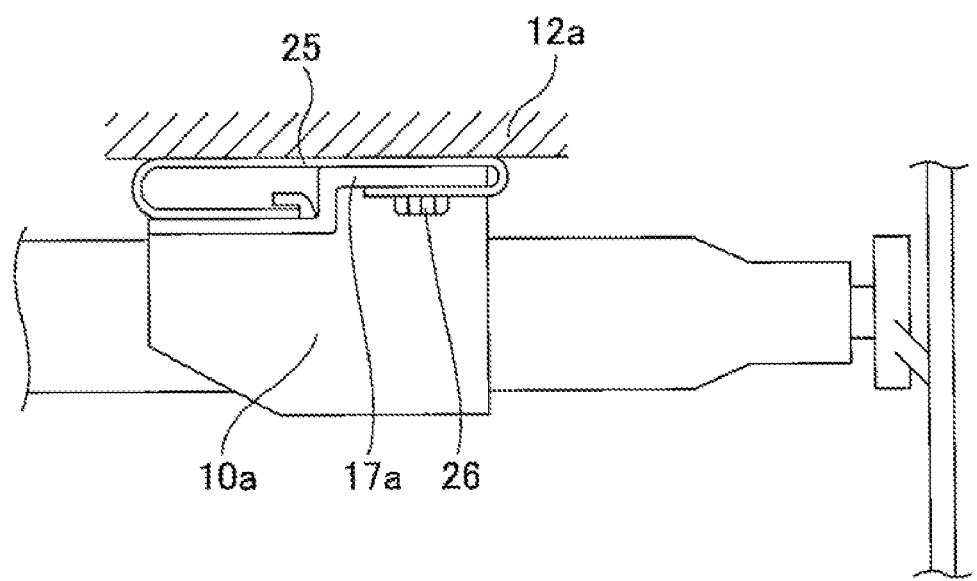
FIG. 14 is a partial side view illustrating a first example of an impact absorbing steering apparatus in which a prior known energy absorbing member is installed.
Figure 15:
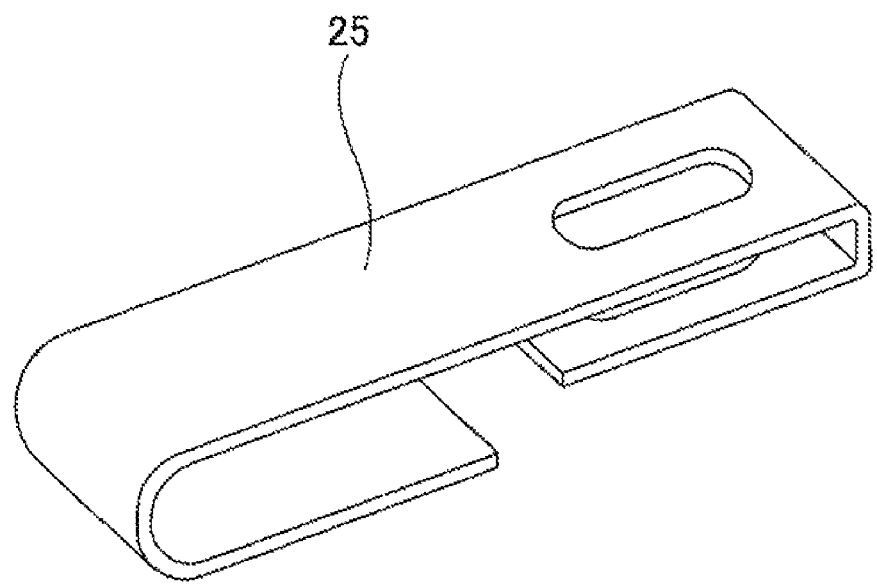
FIG. 15 is a perspective view of the energy absorbing member of the apparatus in FIG. 14 as seen from the upper front.
Figure 16:
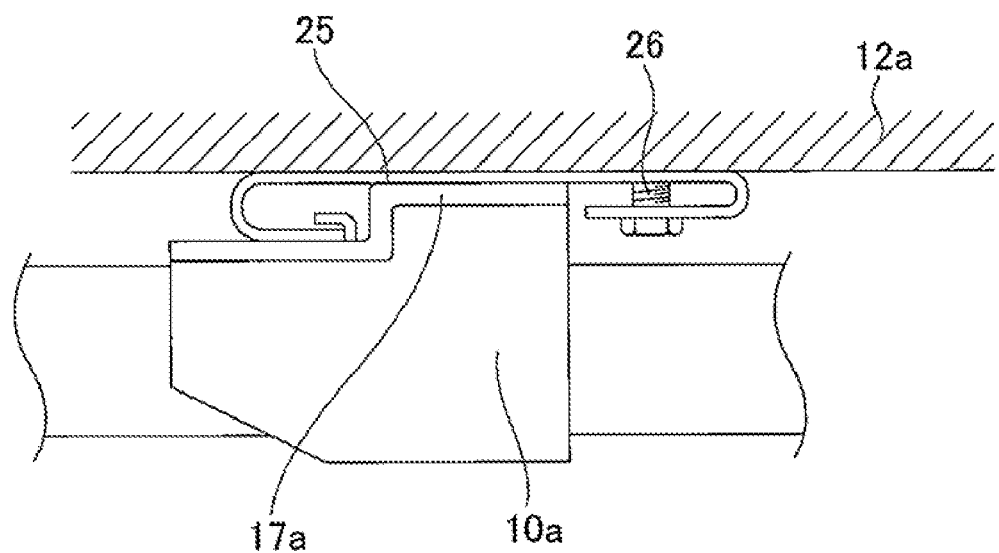
FIG. 16 is a partial side view illustrating the apparatus in FIG. 14 in the state where a secondary collision has proceeded.

Particularly, in the case of the construction of this embodiment, a pair of energy absorbing members 35a, 35b are provided between the pair of left and right installation plate sections 17c, 17d that are located on the bracket 10c on the column side and the bolts 34 that are the portions that are fastened to the vehicle body. These energy absorbing members 35a, 35b are basically the same as the energy absorbing member 25 that is disclosed in Patent Literature 1 and described using FIGS. 14 to 16, and each is formed by bending a plastically deformable metal plate such as a mild steel plate. In the case of this embodiment, the energy absorbing members 35a, 35b comprise a base plate section 36 and plastically deforming sections 37a, 37b. A circular hole 38 through which the bolt 34 will be inserted is formed in the center section of the base plate section 36. Two locations on the both end section in the width direction of the rear end edge of the base plate section 36 are bent upward and function as restraining pieces 39, and the surfaces on the front side of these retraining pieces 39 engage with the rear end edge of the sliding plate 33a. These restraining pieces 39 are provided in order to make it possible to position the base plate section 36 with respect to the sliding plate 33a. Furthermore, the plastically deforming sections 37a, 37b are formed by bending back the middle section of a band shaped portion that extends in the forward direction from the center section on the front end edge of the base plate section 36 approximately 180° into a U shape.

The construction of these energy absorbing members 35a, 35b are basically the same as each other, however, the rigidity of the plastically deforming portions are different from each other. In order for this, in a first example, the width dimensions, W, w of the plastically deforming sections 37a, 37b are different from each other. More specifically, the width dimension W of the plastically deforming section 37a of the energy absorbing member 35a that is mounted on the installation plate section 17c on the far side (top side in FIG. 1) from the electric motor 13a is relatively large. On the other hand, the width dimension w of the plastically deforming section 37b of the energy absorbing member 35b that is mounted on the installation plate section 17c on the near side (bottom side in FIG. 1) to the electric motor 13a is relatively small (W>w).

The base plate sections 36 of these energy absorbing members 35a, 35b are supported by the bolts 34, 34, and together with being connected to the vehicle body such that displacement in the forward direction is prevented, they are installed by engaging the tip end edges of the plastically deforming sections 37a, 37b with the bracket 10c on the column side where the installation plate section 17c is located. An anchor plate section 45 with which the tip end edge of the plastically deforming plates 37a, 37b come in contact is formed by bending forming on the lower section of the installation plate section 17c on both the left and right sides of the bracket 10c on the column side. This anchor plate section 45 is formed by bending the rear end section on the bottom plate section that is located on the bottom of the installation plate section 17c upward, and the plastically deforming sections 37a, 37b are located in the space between the bottom surface of the installation plate section 17c and the top surface of the bottom plate section.

During a secondary collision, both bolts 34 come out from the cut out sections 18a, 18b together with the sliding plates 33a, 33b and the base plate sections 36 of the energy absorbing members 35a, 35b, which allows the steering column 6c to displace in the forward direction. The bracket 10c on the column side also displaces in the forward direction together with the steering column 6c. When this happens, the bracket 32 on the housing side also drops away from the vehicle body, which allows this bracket 32 on the housing side to displace in the forward direction. As the bracket 10 on the column side displaces in the forward direction, the plastically deforming sections 37a, 37b of the energy absorbing members 35a, 35b plastically deforms from the state illustrated in FIG. 1 to the state illustrated in FIG. 3 in a direction that causes the bent back section that is formed in the middle section of the band shaped plate sections to move to the tip end side of this band shaped portion. Due to this plastic deformation, the impact energy that is transmitted from the body of the driver to the bracket 10c on the column side by way of the steering shaft 5a and steering column 6c is absorbed, which lessens the impact applied to the body of the driver.

Particularly, in the case of the construction of this embodiment, due to the difference in the width dimensions W, w of the plastically deforming sections 37a, 37b of the energy absorbing members 35a, 35b, resistance to the displacement in the forward direction of the installation plate sections 17c that are located on both end section of the bracket 10 on the column side due to the existence of the energy absorbing members 35a, 35b differs from each other. More specifically, the resistance against the displacement of the installation plate section 17c on the electric motor 13a side is less than the resistance against the displacement of the installation plate section 17c on the side opposite from the electric motor 13a. Due to the difference in the resistance, when the existence of the electric motor 13a is ignored, the installation plate section 17c on the side where the electric motor 13a is located drops away toward the front more easily than the installation plate section 17c on the side opposite from the electric motor 13a.

However, in an actual case, due to the existence of the electric motor 13a having a large inertial mass, it becomes difficult for the installation plate section on the side where the electric motor 13a is located to displace in the forward direction during a secondary collision. Therefore, due to the existence of the electric motor 13a, the difficulty of displacement in the forward direction of the installation plate section 17c on the side where the electric motor 13a is located, is cancelled out by the ease in which the installation plate section 17c drops away because of the small width dimension w of the plastically deforming section 37b of the energy absorbing member 35b. Therefore, the steering column 6c that supports the bracket 10c on the column side where the installation plate section 17c is located displaces smoothly in the axial direction. As a result, the sliding of the friction fit at a plurality of location and the plastic deformation of the plastically deforming sections 37a, 37b of the energy absorbing members 35a, 35b that are located between the bolts 34 and the bracket 10c on the column side that absorb impact energy that is applied to the steering column during a secondary collision is performed effectively from the aspect of absorbing impact energy, and make it easier to completely protect the driver.

Second Example of Embodiment 1

Figure 5:
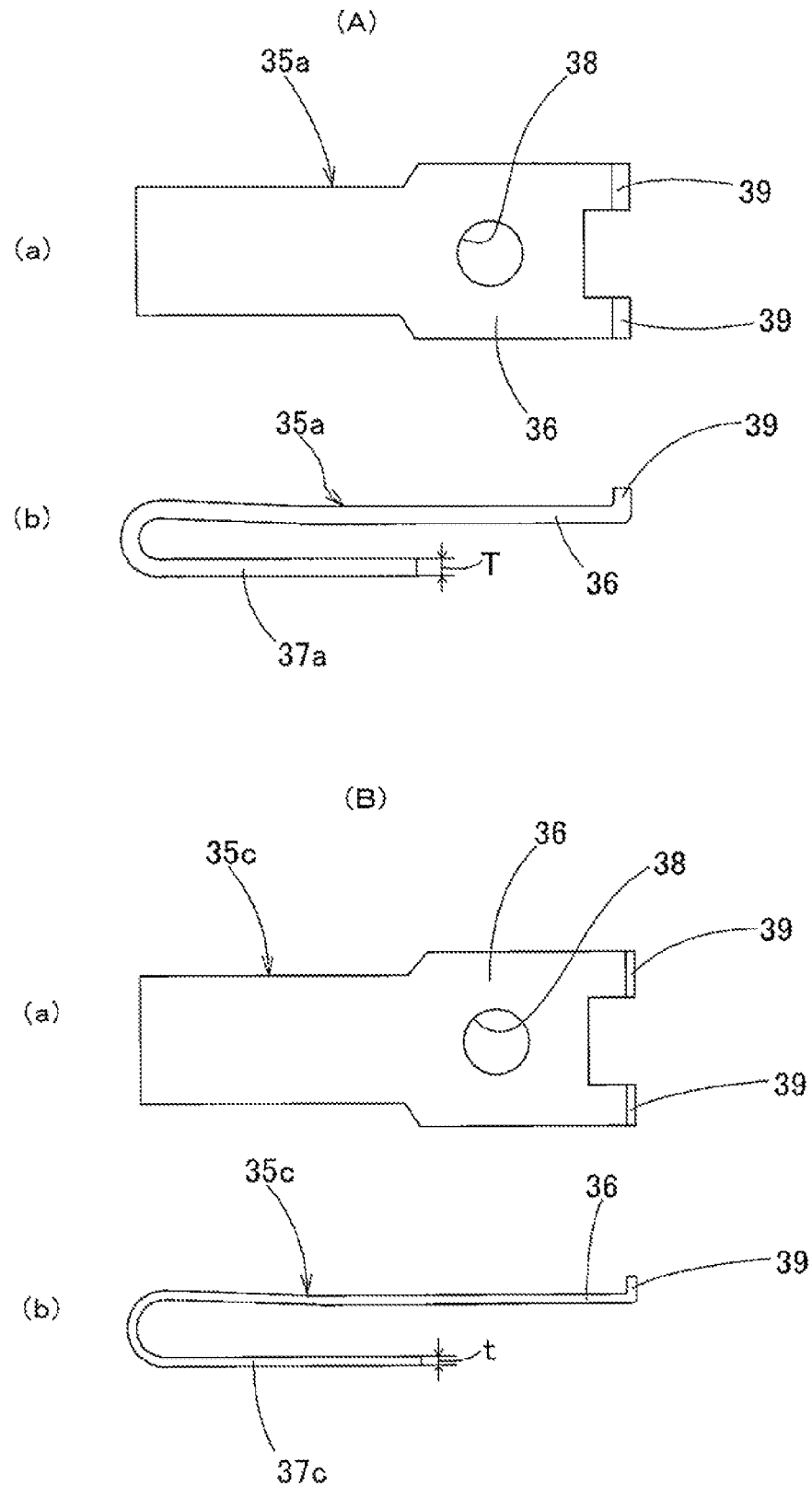
FIGS. 5A and 5B are drawings similar to the drawings in FIGS. 4A and 4B, and illustrate a second example of the first embodiment of the present invention.
Figure 6:
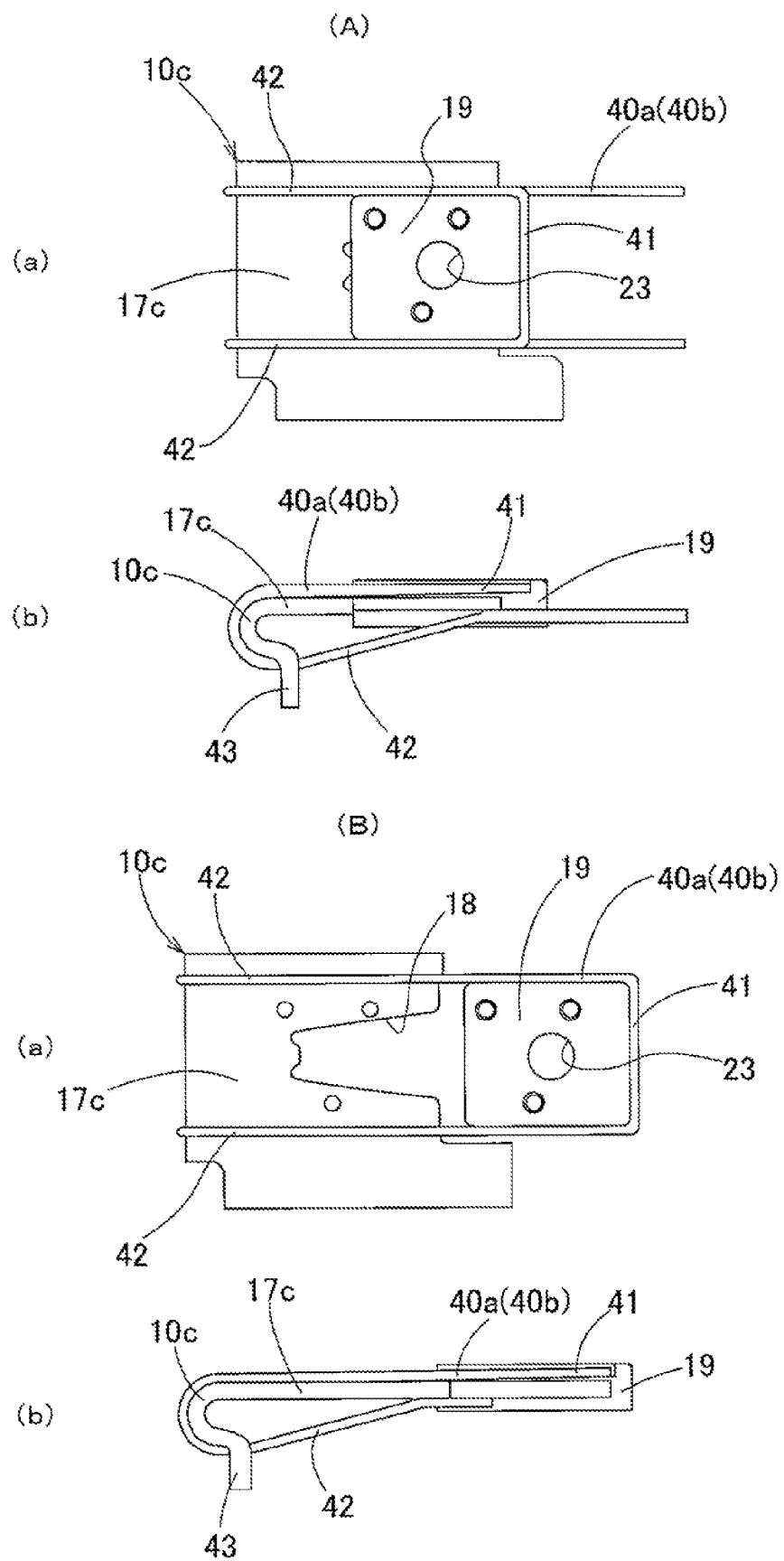
FIG. 6A is a drawing illustrating the normal state of the installation plate section of a support bracket, a capsule installed in the installation plate section, and an energy absorbing member that spans between the installation plate section and the capsule in first example of second embodiment of the present invention.
FIG. 6B is a drawing illustrating the state where a secondary collision has proceeded, where (a) is a top view and (b) is a side view in each drawing.

FIGS. 5A and 5B illustrate a second example of the first embodiment of the present invention. In the case of this example, of the plastically deformable metal plate of the pair energy absorbing members 35a, 35c, the thickness dimension t of the energy absorbing member 35c that is mounted on the installation plate section 17c (see FIGS. 1 to 3) that near to the electric motor 13a is less than the thickness dimension T of the energy absorbing member 35a that is mounted on the installation plate section 17c (see FIG. 1) on the far side from the electric motor 13a. In the case of this example, at least the thickness dimension of the plastically deforming section 37c of the energy absorbing member 35c on the electric motor 13a side should be less than the thickness dimension of the plastically deforming section 37a of the energy absorbing member 35a on the opposite side from the electric motor 13a.

In the case of this example, due to the difference in the thickness dimensions T, t of the metal plate of the energy absorbing members 35a, 35c, the resistance against the displacement in the forward direction of the installation plate sections 17c that are located on both end section of the bracket 10c on the column side by the existence of the energy absorbing members 35a, 35c differs from each other. Due to this difference in resistance, the installation plate section 17c on the side where the electric motor 13a is located drops away more easily than the installation plate section 17c on the opposite side from the electric motor 13a, and as a result, the steering column 6c that supports the bracket 10c on the side of the column where the installation plate sections 17c are located displaces smoothly, and it becomes easier to completely protect the driver.

Except for changing the thickness dimension instead of the width dimension in order to change the load required for plastically deforming the energy absorbing members 35a, 35c, this example is the same as the first example, so illustrations and explanations of identical parts are omitted.

Embodiment 2

Figure 17:
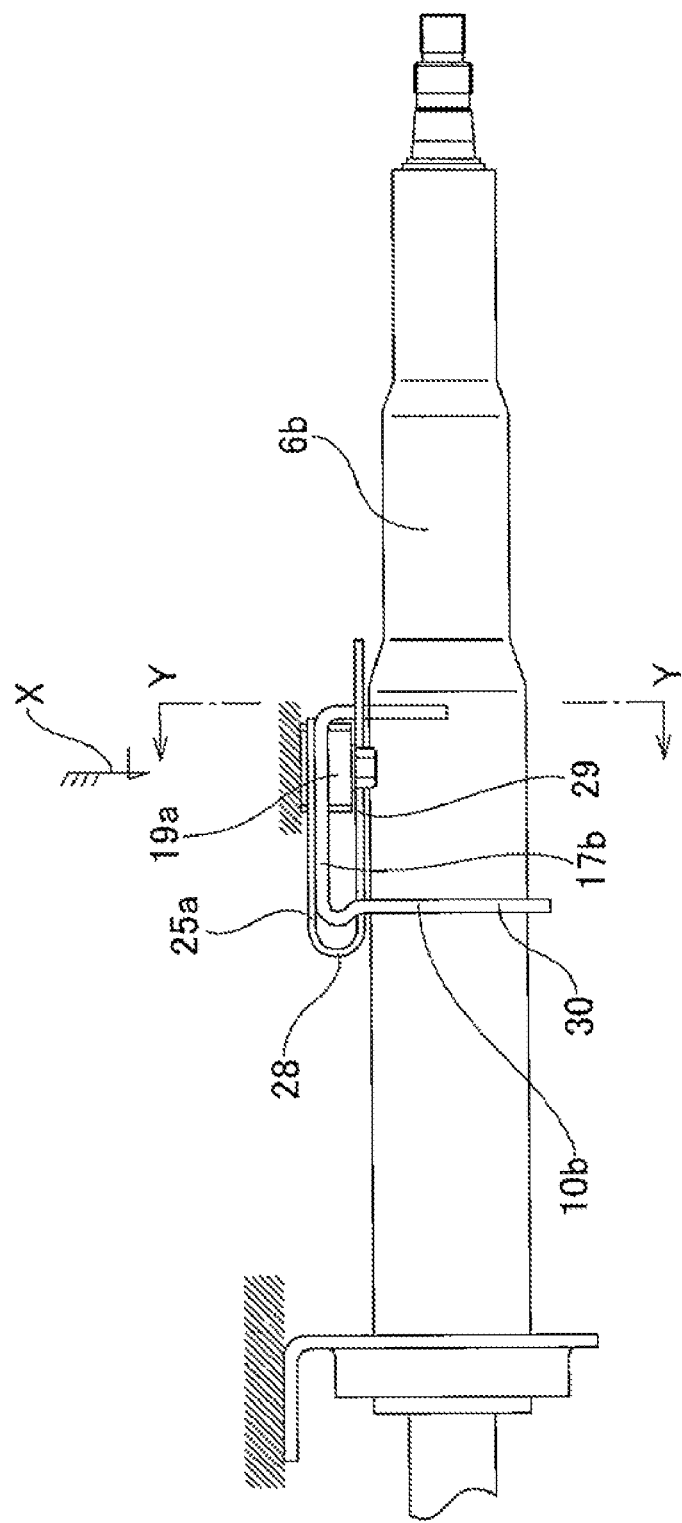
FIG. 17 is a partial side view illustrating a second example of an impact absorbing steering apparatus in which a prior known energy absorbing member is installed.
Figure 18:
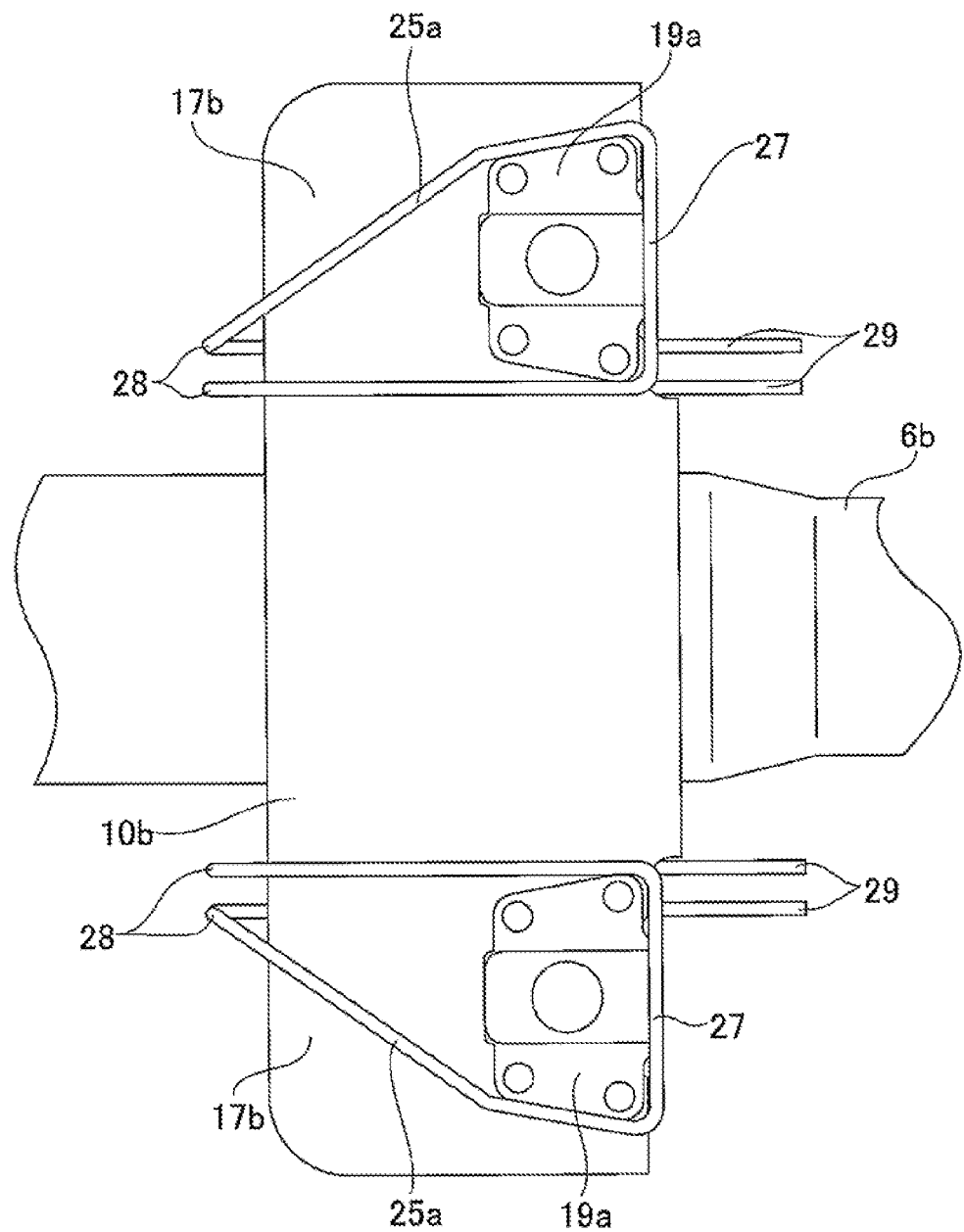
FIG. 18 is a view as seen in the direction X in FIG. 17.

FIGS. 6A, 6B and FIGS. 7A, 7B illustrate an example of a second embodiment of the present invention. In the case of this example, a plastically deformable wires, which are formed by bending similar to the construction disclosed is Patent Literature 2 explained in FIGS. 17 to 19, are used as the energy absorbing members 40a, 40b that absorb impact energy that is applied in the forward direction from the steering wheel to the bracket 10c on the column side that is supported by steering column 6c (FIGS. 1 to 3, and FIG. 10) during a secondary collision, and allow the bracket 10 on the column side to displace in the forward direction.

Figure 11:
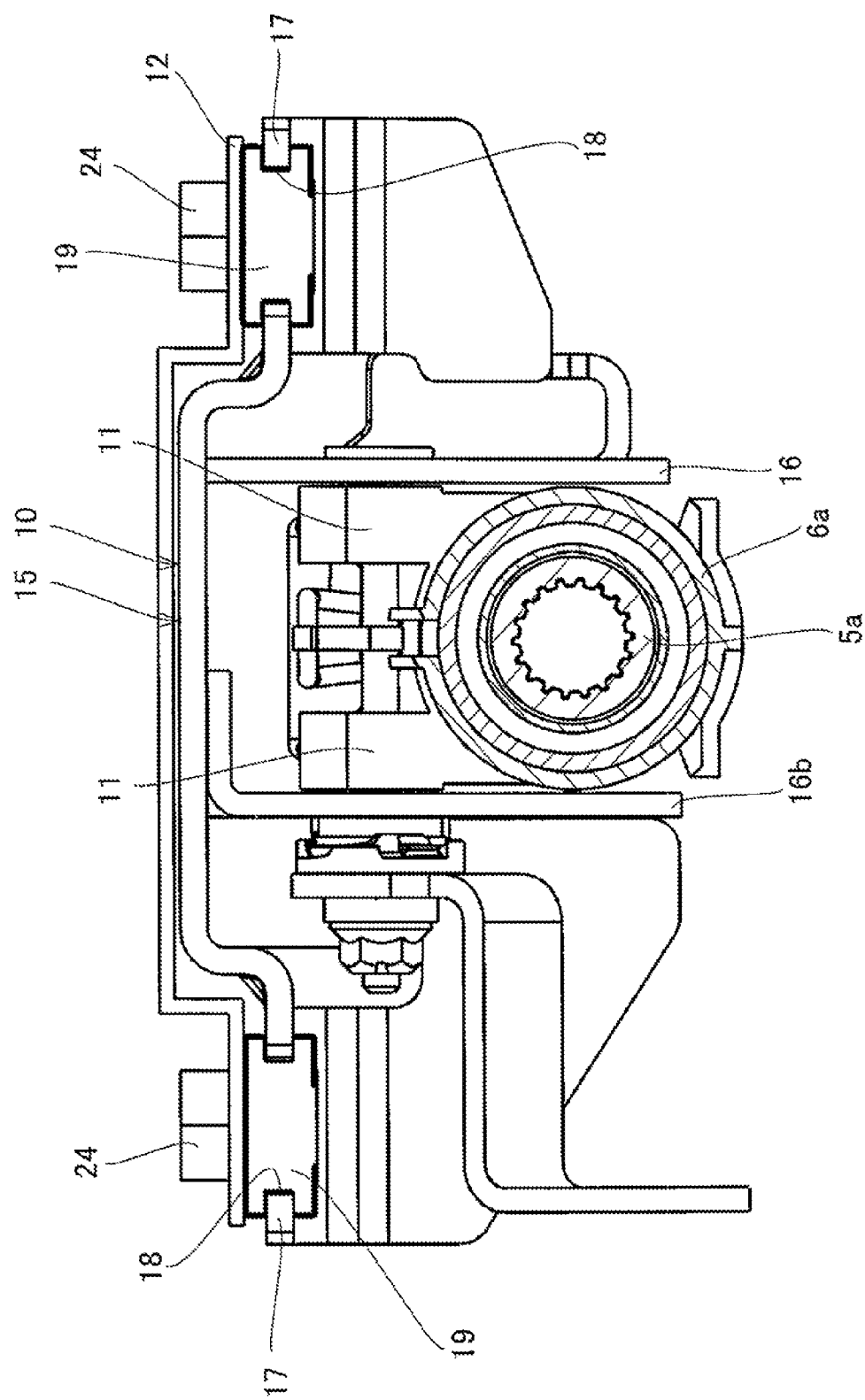
FIG. 11 is a cross-sectional view of the apparatus in FIG. 10.
Figure 12:
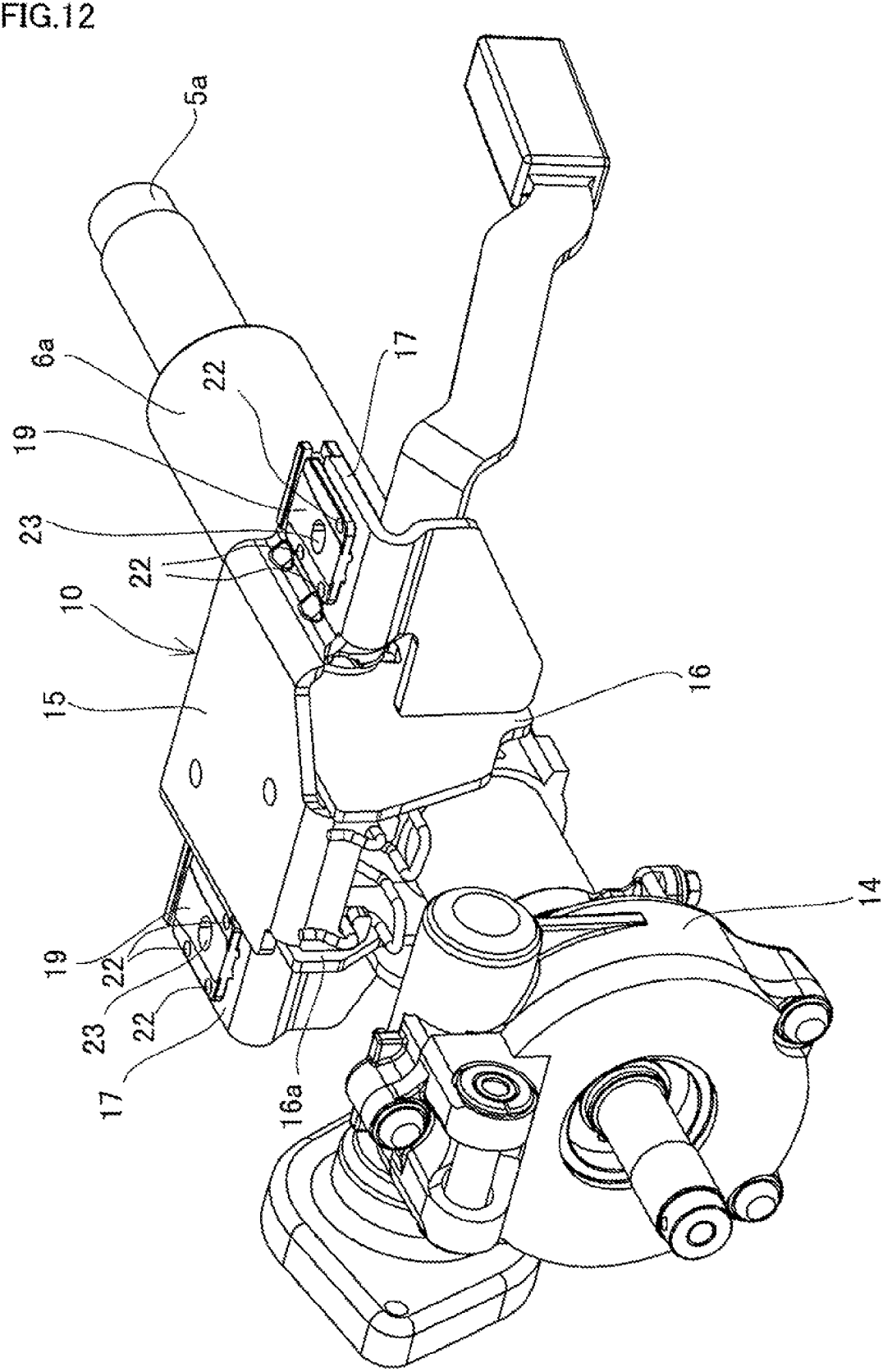
FIG. 12 is a perspective view similar to FIG. 10 and illustrates the apparatus in FIG. 10, with the bracket on the vehicle side omitted.
Figure 13:
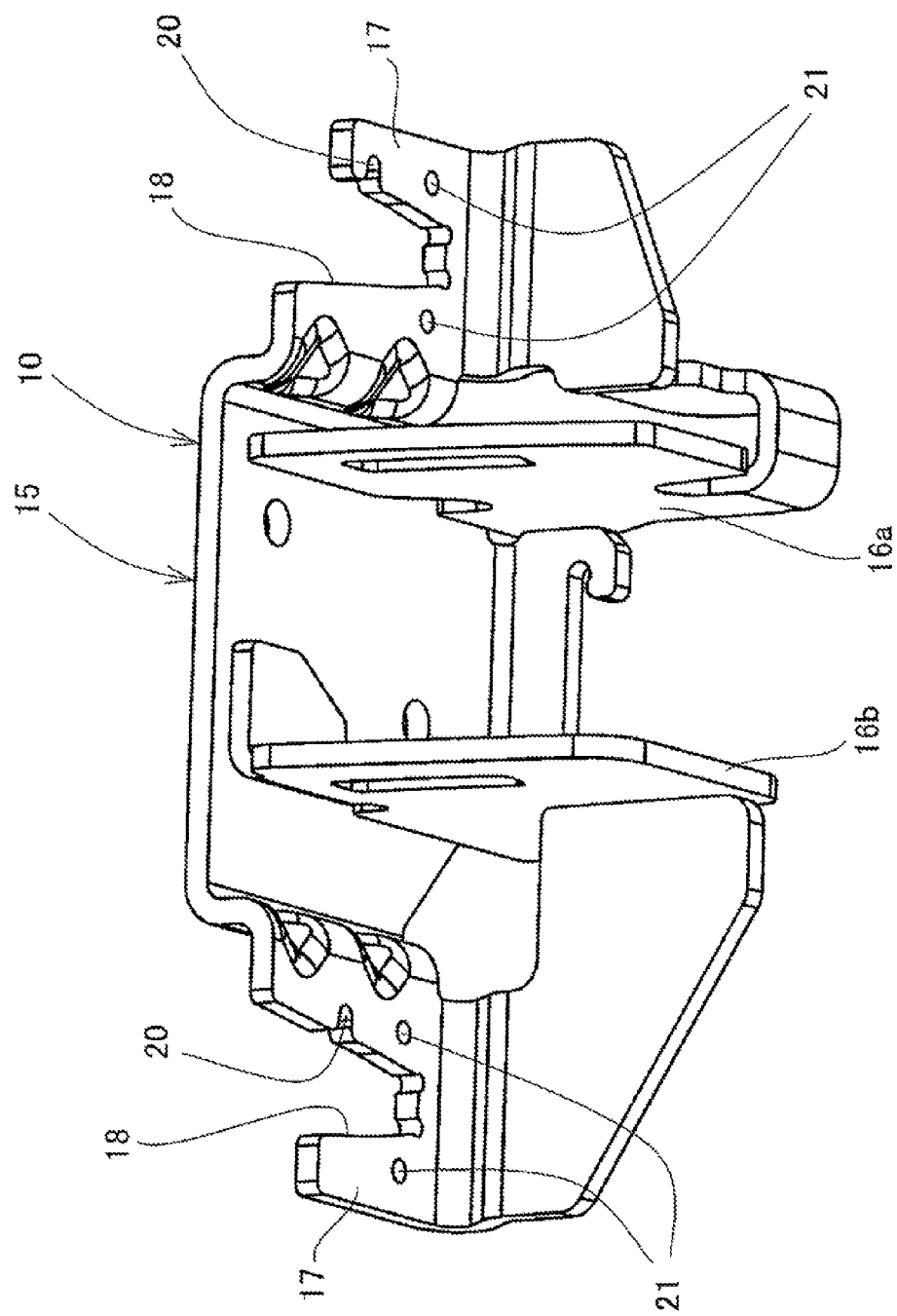
FIG. 13 is a perspective view of the support bracket in the apparatus in FIG. 10 as seen from the lower rear.
Figure 19:
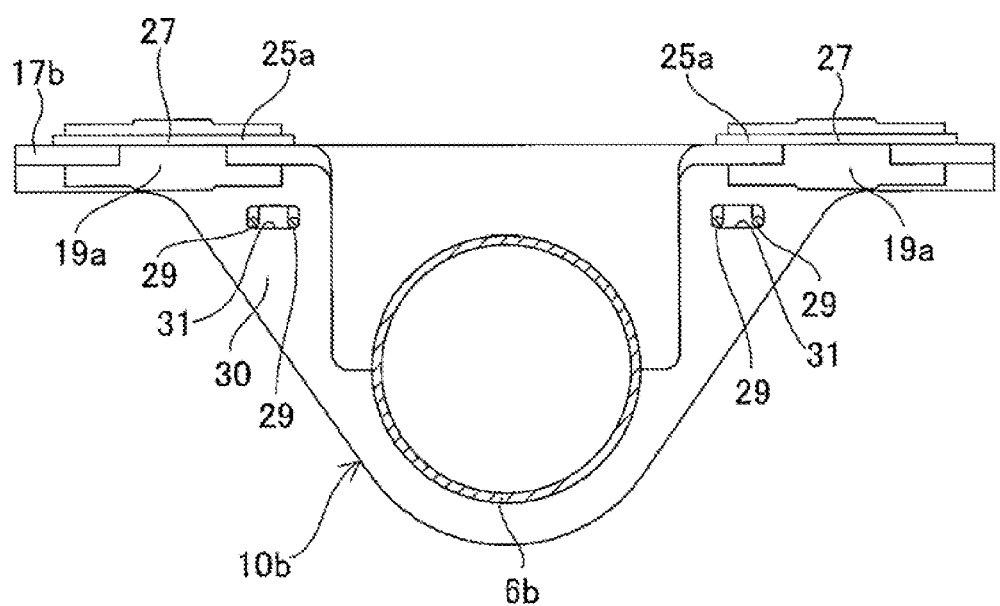
FIG. 19 is a cross-sectional view of section Y-Y in FIG. 17.

In other words, in the case of the construction of this embodiment, as in the conventional construction illustrated in FIG. 11 and FIG. 13, or in the construction disclosed in Patent Literature 2 and illustrated in FIG. 19, cut out sections 18 are formed in a pair of left and right installation plate sections 17c and open at the rear end edge of the installation plate sections 17c. Capsules 19 are installed in these cut out sections 18 such that they are able to come out toward the rear from these cut out sections 18 when an impact load in the forward direction is applied to the installation plate sections 17c. The construction of this portion employs prior known construction such as shear pin that span between the capsules 19 and the installation plate sections 17c. Moreover, by inserting a bolt through a through hole 23 that is formed in the capsule 19 is screwing that bolt into a nut that is fastened to the vehicle side, and by further tightening the bolt, the capsule 19 is supported by the vehicle body such that it is prevented from displacing in the forward direction regardless of an impact load in the forward direction. In the definition of the present invention, the capsule 19 may be treated as a member of the portion that is fastened to the vehicle.

Figure 7:
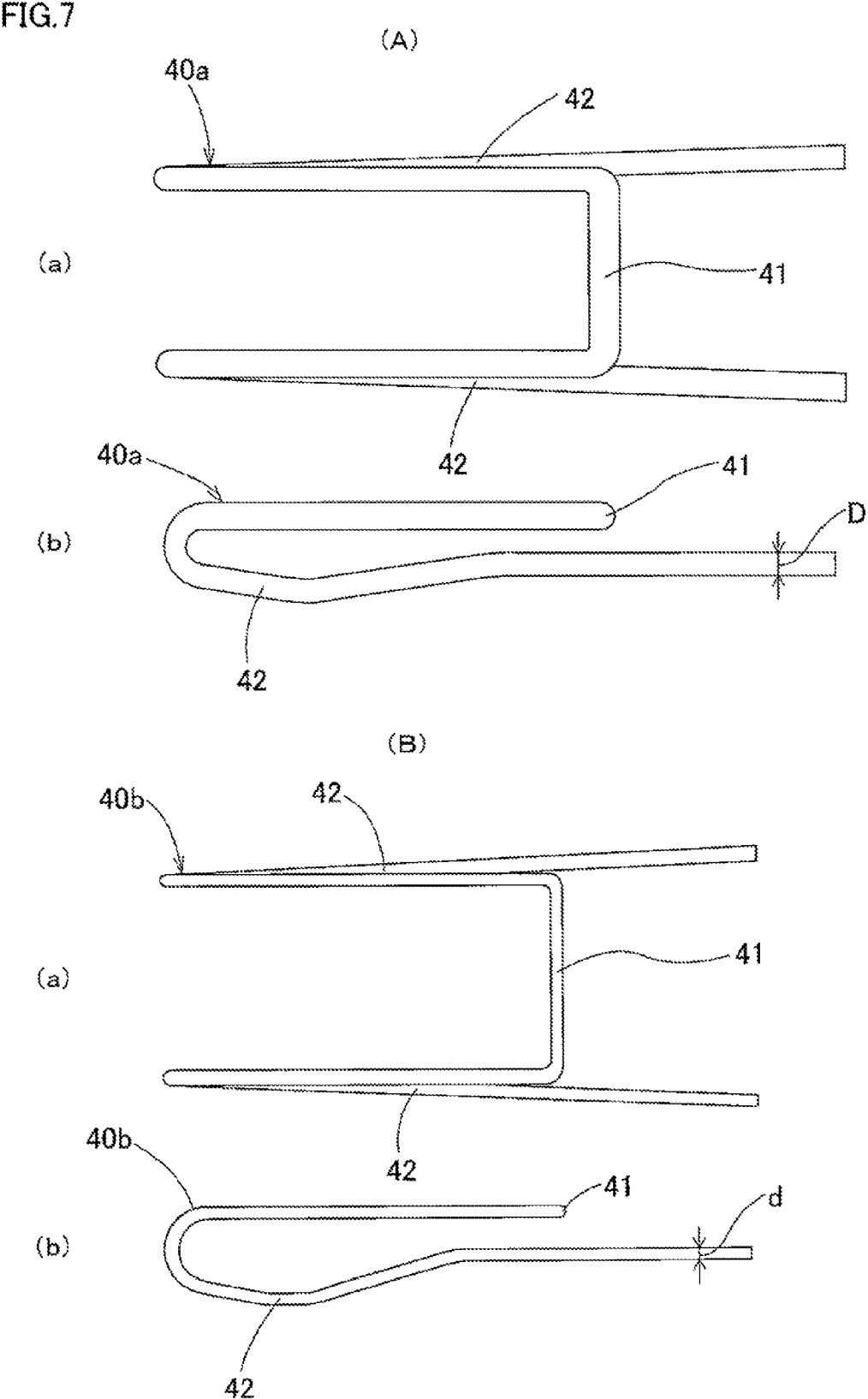
FIG. 7A illustrates an energy absorbing member on the side opposite from the electric motor in the first example of the second embodiment of the present invention.
FIG. 7B illustrates an energy absorbing member on the side of the electric motor, where (a) is a top view and (b) is a side view in each drawing.

Furthermore, a pair of energy absorbing members 40a, 40b as illustrated in FIGS. 7A and 7B is provided between the capsules 19 and the installation plate sections 17c. These energy absorbing members 40a, 40b are formed by bending plastically deformable wires, and when an impact load is applied in the forward direction to the installation plate sections 17c, these wire elongate, which allows the installation plate sections 17c to displace in the forward direction. In other words, the energy absorbing members 40, 40b each comprises a U-shaped base section 41 that opens on the front side, and a pair of left and right plastically deforming sections 42 that extend in the forward direction from both end sections of this base section 41 and are bent back nearly 180° at the middle section thereof. The base sections 41 of these energy absorbing members 40a, 40b fit with the rear of the capsules 19, and the bent back sections of the plastically deforming sections 42 face the front end edges of the installation plate sections 17c, and the front half section of these plastically deforming sections 42 are inserted from the front toward the rear through small through holes that are located in a hanging down plate section 43 that is formed by bending the front end edges of the installation plate sections 17c downward.

In the case of this construction as well, the rigidity of the energy absorbing members 40a, 40b is such that the rigidity of the energy absorbing member on the side near the electric motor is smaller than that of the energy absorbing member on the side far from the electric motor. In other words, of the wires that form the energy absorbing members 40a, 40b, the diameter d of the wire that forms the energy absorbing member 40b that is mounted on the installation plate section 17c on the side near the electric motor is less than the diameter D of the wire that forms the energy absorbing member 40 that is mounted on the installation plate section 17c on the side far from the electric motor.

During a secondary collision, the front end edge of the installation plate sections 17c press against and move the plastically deforming sections 42 of the energy absorbing members 40a, 40b toward both end sections of the wires. This allows the steering column 6c to displace in the forward direction together with the bracket 10c on the column side as the impact energy that is applied from the steering wheel to the steering column 6c is absorbed.

In the case of this embodiment, due to the difference in the diameters D, d of the wires that form the energy absorbing members 40a, 40b, the resistance against the displacement in the forward direction of the installation plate sections 17c, which are provided on both end sections of the bracket 10c on the column side, due to the existence of these energy absorbing members 40a, 40b differs from each other. Due to the difference in resistance, the installation plate section 17c on the side where the electric motor 13a is located drops away toward the front more easily than the installation plate section 17c on the opposite side from the electric motor 13a, and as a result, the steering column 6c that supports the bracket 10c on the column side where the installations plate sections 17c are located can be displaced smoothly, making it easier to completely protect the driver.

Except for the difference in the construction of the energy absorbing members 40a, 40b, this embodiment is the same as the first embodiment, so illustrations and explanations of identical parts are omitted.

Embodiment 3

Figure 8:
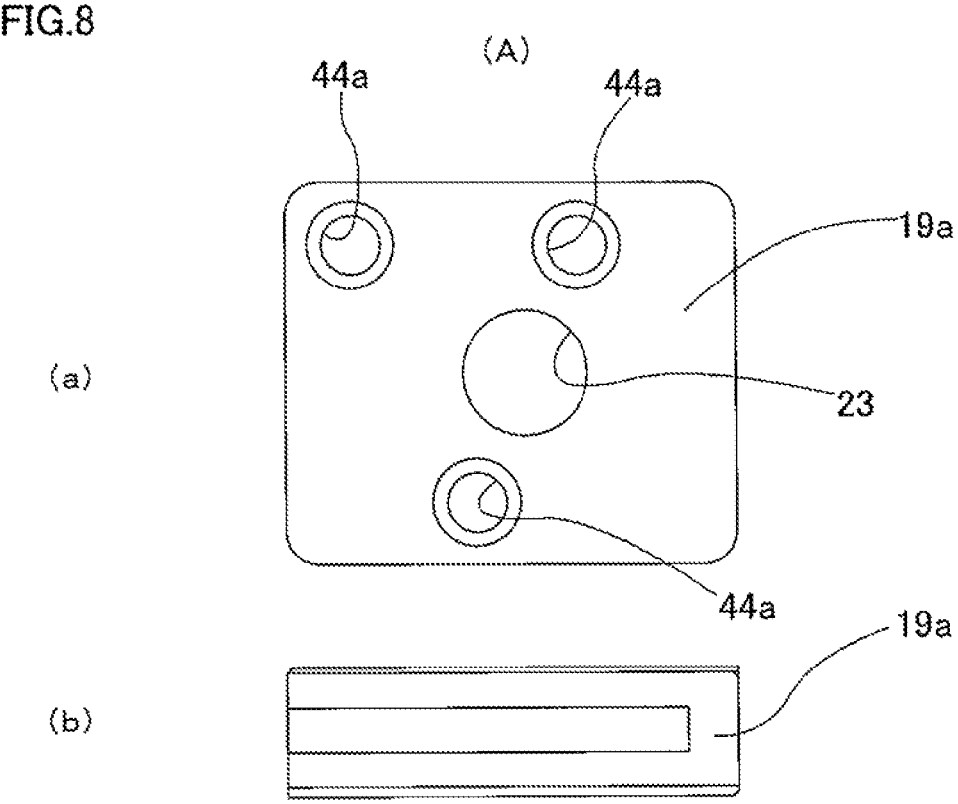
FIG. 8A illustrates a capsule on the side opposite from the electric motor in a first example of a third embodiment of the present invention.
FIG. 8B illustrates a capsule on the side of the electric motor, where (a) is a top view and (b) is a side view in each drawing.
Figure 8:
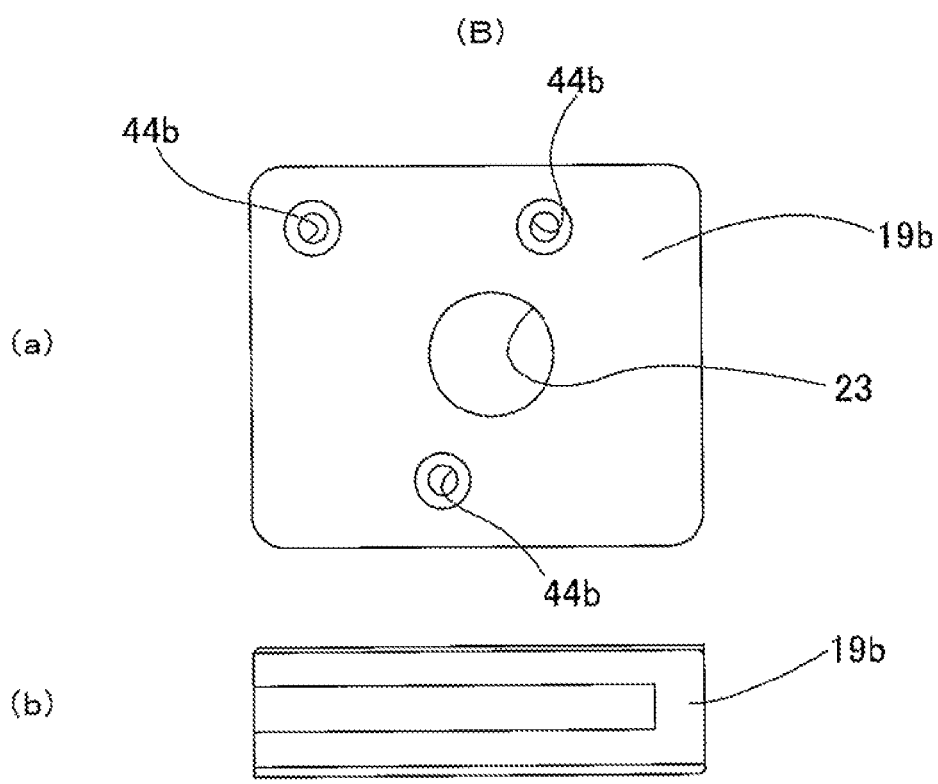
Figure 9:
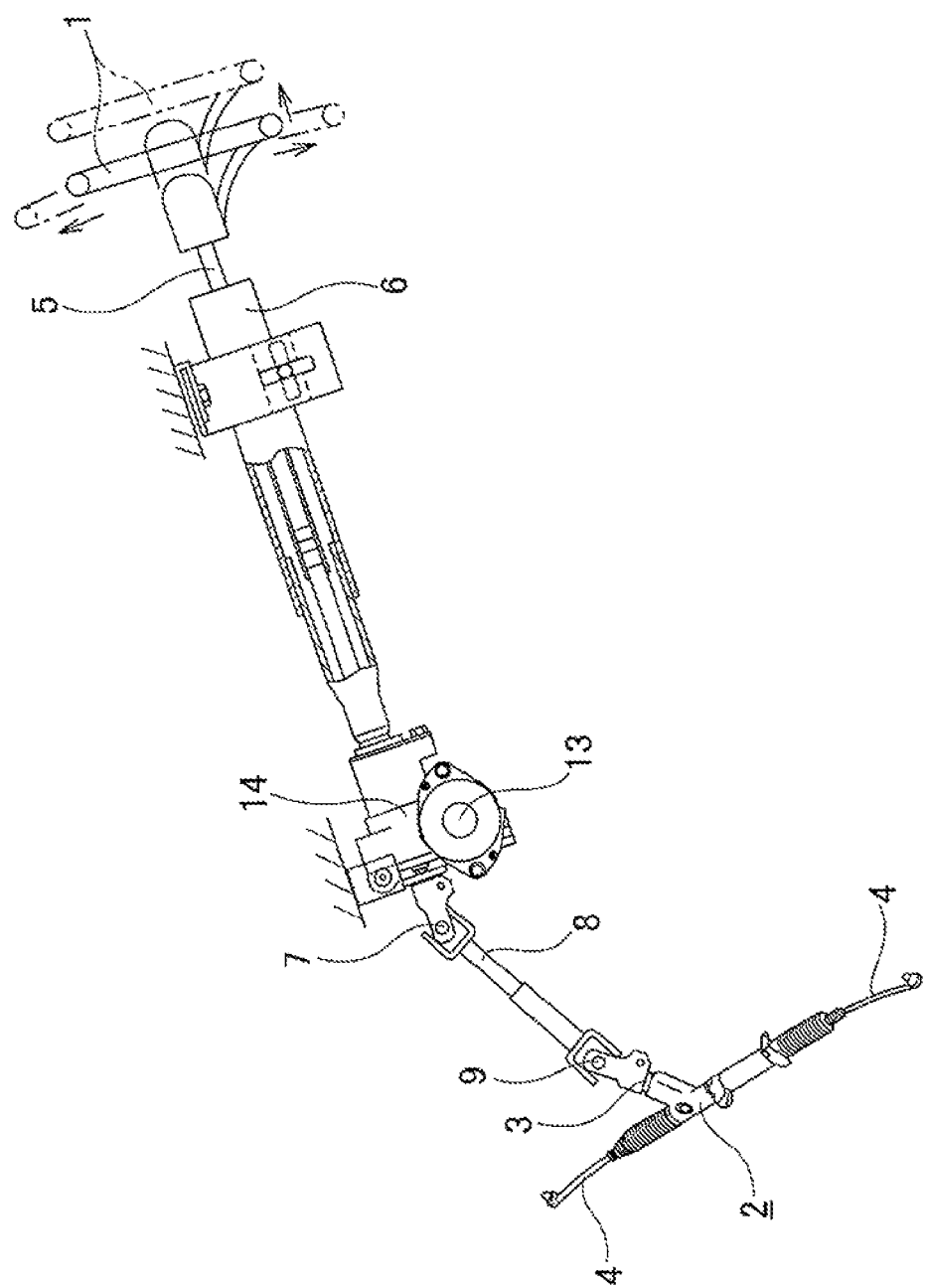
FIG. 9 is a partial cross-sectional view illustrating an example of a conventional steering apparatus.
Figure 10:
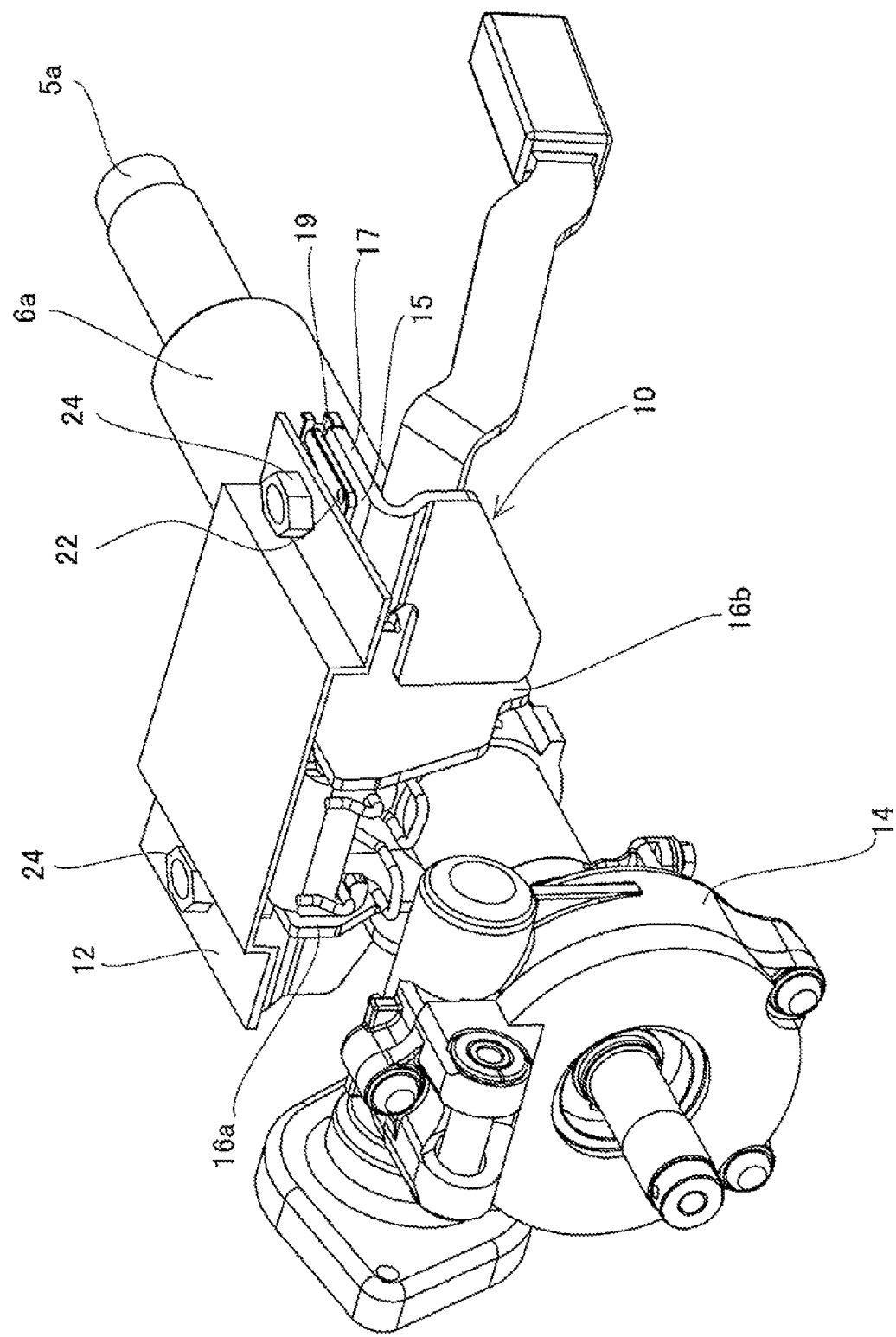
FIG. 10 is a perspective view illustrating an example of a conventional impact absorbing steering apparatus as seen from the upper front.

FIGS. 8A and 8B illustrate an example of a third embodiment of the present invention. In the case of this embodiment as well, as in the second embodiment, capsules 19a, 19b as illustrated in FIGS. 8A and 8B are installed inside cut out sections 18a (see FIG. 1) that are formed in the pair of left and right installation plate sections 17c that are provided on the bracket 10c on the column side such that they open into the rear end edge. The shape and construction of these capsules 19a, 19b, and the basic construction for supporting these capsules 19a, 19b by the installation plate sections 17c are the same as prior known construction as disclosed in Patent Literature 2. In other words, small through holes 44a, 44b are formed in plate sections on both the left and right sides of the capsules 19a, 19b at positions that are aligned with concave sections 20 and small through holes 21 (see FIG. 13) that are formed in the inner circumferential edge or surrounding portion of the cut out sections 18 of the installation plate sections 17c. These small through holes 44a, 44b function as locking sections on the fastened side. The concave sections 20 and small through holes 21 (see FIG. 13) of the installation plate sections 17c function as locking sections on the displacing side. Shearing pins (not illustrated in the drawings) are provided or formed with insert molding such that they span between the small through holes 44a, 44b, which function as locking sections on the fastened side, and the concave sections 20 and small hole sections 21 (see FIG. 13), which function as locking sections on the displacing side. When installed in the vehicle, the capsules 19a, 19b are supported by and fastened to the vehicle body by a bolt or a stud that is inserted through a through hole 23 that is formed in the center of the capsules 19a, 19b. Therefore, during a secondary collision, the bracket 10c on the column side displaces in the forward direction as the shear pins shear and the capsules 19a, 19b come out from the cut out sections 18a.

Particularly, in the case of the construction of this embodiment, by making the inner diameters of the small though holes 44a, 44b in the capsules 19a, 19b, and the concave sections 20 and the small through holes (FIG. 13) in the installation plate sections 17c different, and making the diameters of the shear pins that are installed such that they span between these different, the rigidity of the these shear pins differ on the left and right. More specifically, the diameter of the shear pins that span between the capsule 19b that is illustrated in FIG. 8B and the installation plate section 17c on the side near the electric motor 13a is less than the diameter of the shear pins that span between the capsule 9a that is illustrated in FIG. 8A and the installation plate section 17c on the side far from the electric motor 13a (see FIGS. 1 to 3). The material used for the pins that support the capsules 19a, 19b on the both the left and right is the same. Therefore, the shear pins that support the capsule 19b on the side near the electric motor 13a shear more easily than the shear pins that support the capsule 19a on the far side.

In the case of this embodiment, due to the difference in diameters of the shear pins, the installation plate section 17c on the side where the electric motor 13a is located drop away to the front more easily than the installation plate section 17c on the opposite side from the electric motor 13a, and as a result, the steering column 6c that supports the bracket 10c on the column side where the installation plates are located can be displaced smoothly, and thus it becomes easier to completely protect the driver.

Except for the point of making it easier for the installation plate sections to drop away toward the front by changing the strength of the bond between the capsules 19a, 19b and the installation plate sections 17c, this embodiment is the same as the first and second embodiments, so illustrations and explanations of identical parts are omitted.

In order to change the strength of the bond between the capsules 19a, 19b and the installation plate sections 17c, it is also possible to keep the diameters of the shear pins the same and change the material of the shear pins between the left and right installation plate sections 17c instead. In this case, the shear resistance of the material (for example, synthetic resin) of the shear pins that span between the installation plate section and capsule on the side near the electric motor 13a is less than the shear resistance of the material (for example, soft metal) of the shear pins that span between the installation plate section and capsule on the side far from the electric motor 13a.

Embodiment 4

In order to obtain the effect of the present invention, the load required for the pair of left and right installation plate sections to drop away toward the front from the portion fastened to the vehicle body by bolts or studs should be less on the side close to the electric motor than the side far from the electric motor. In order for this, it is not absolutely necessary to make the rigidity of the pair of left and right energy absorbing members or the shear pins different from each other as described in the first to third embodiments above.

Figure 1:
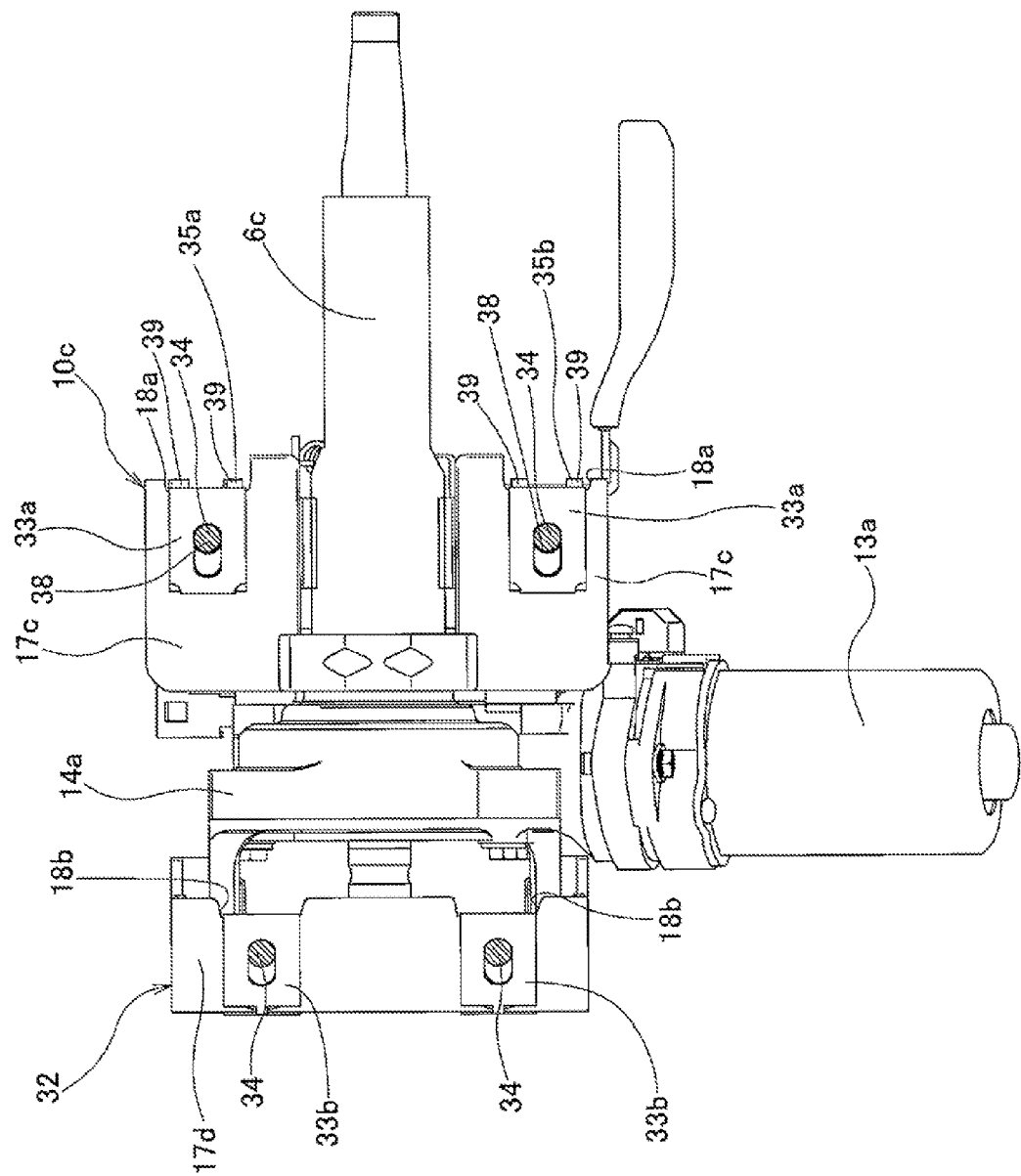
FIG. 1 is a top view illustrating a first example of an apparatus of a first embodiment of the present invention.
Figure 2:
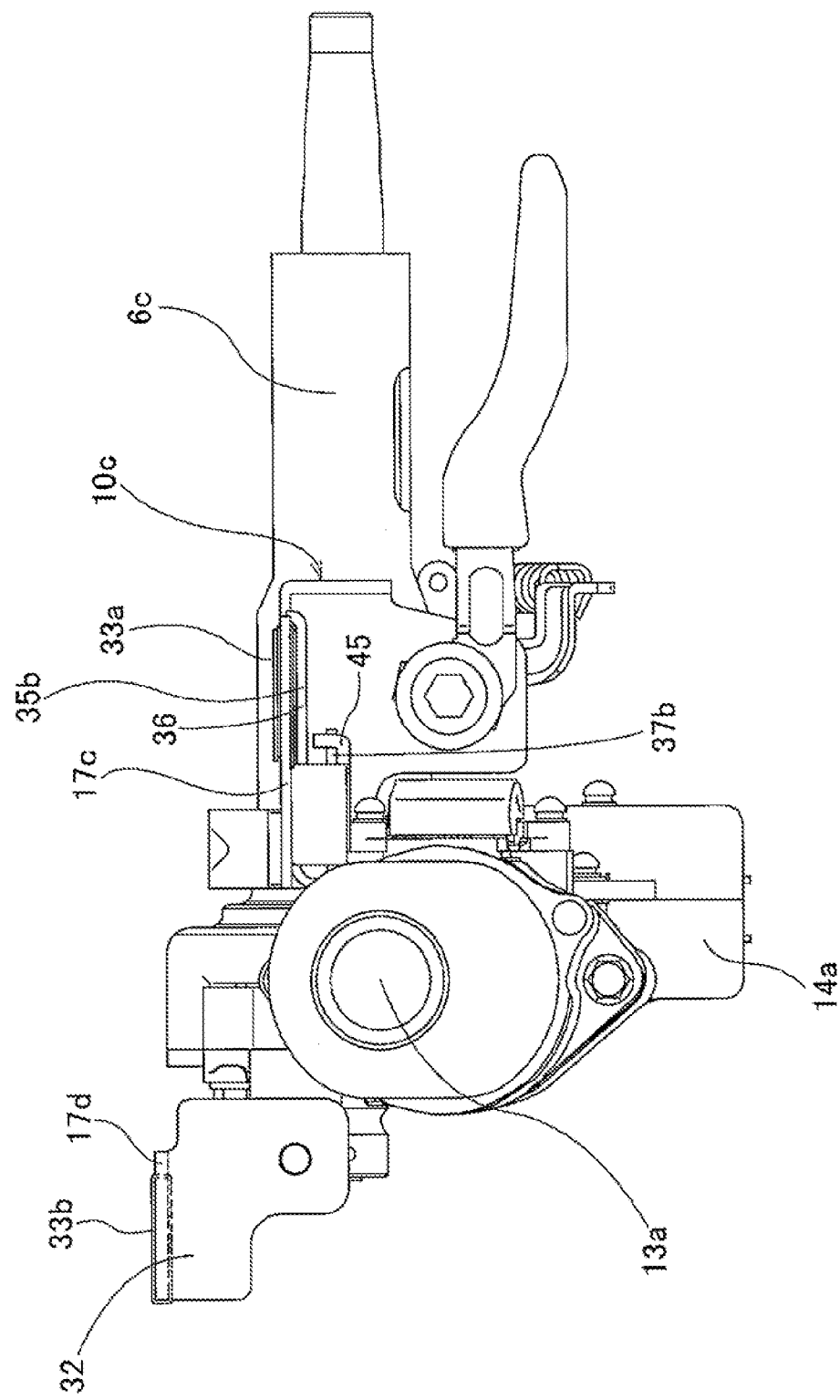
FIG. 2 is a side view of the normal state of the apparatus in FIG. 1.
Figure 3:
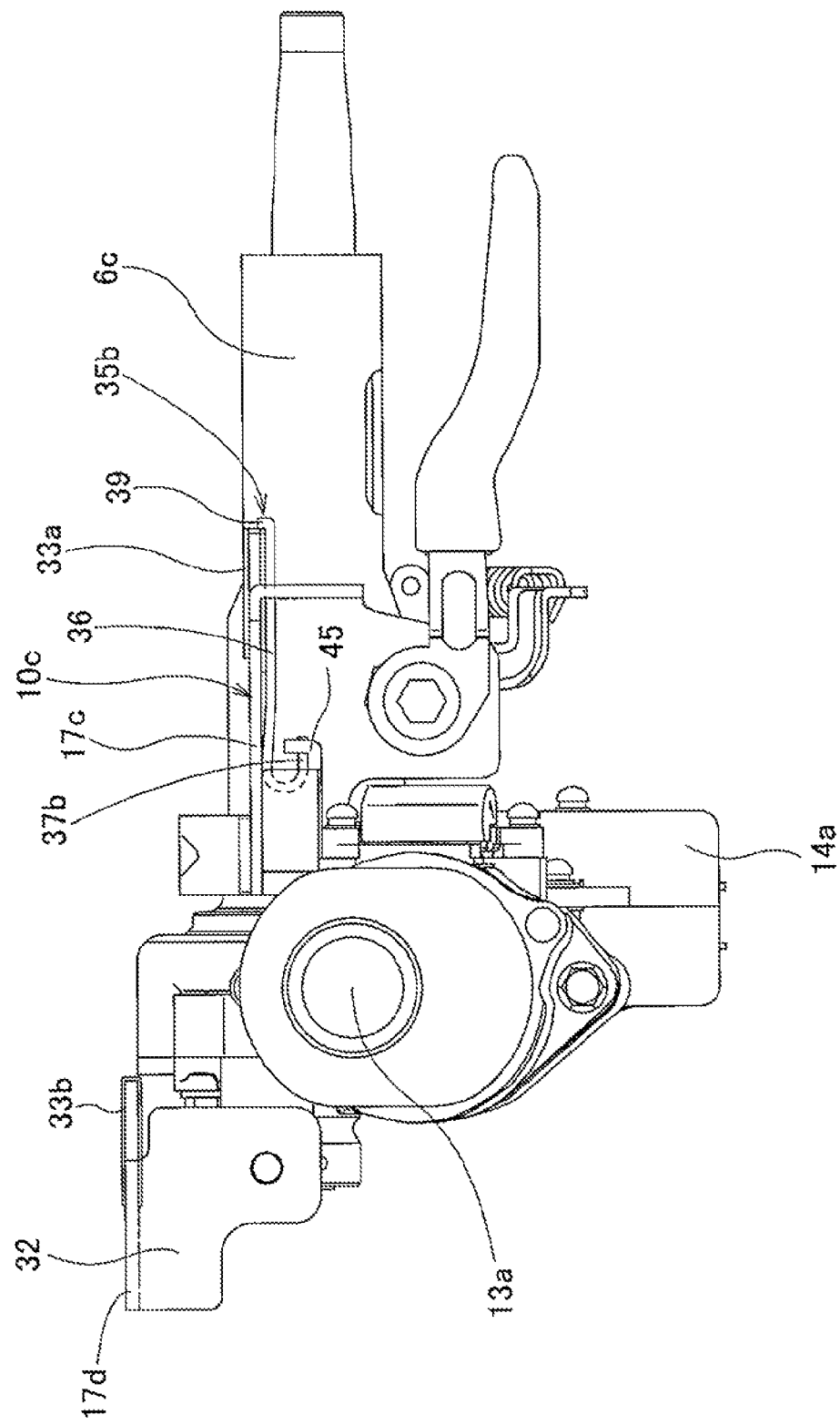
FIG. 3 is a side view of the apparatus in FIG. 1 in the state where a secondary collision has proceeded.
Figure 4:
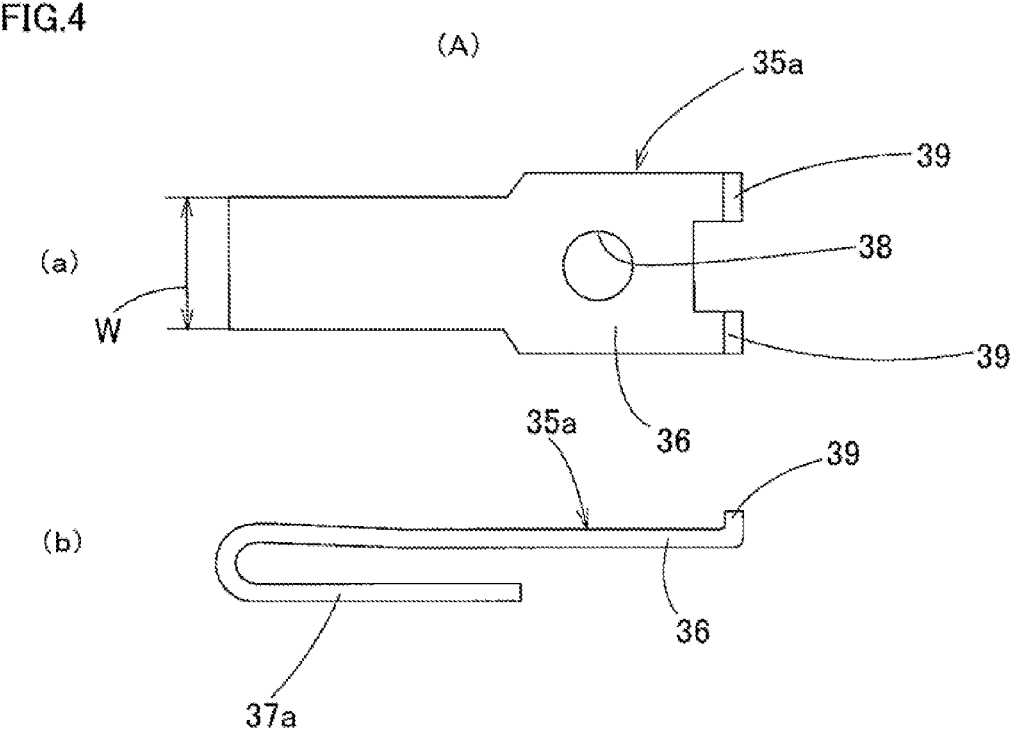
FIG. 4A is a drawing of an energy absorbing member on the side opposite from the electric motor, where (a) is a top view and (b) side view.
FIG. 4B is a drawing of an energy absorbing member on the side of the electric motor, where (a) is a top view and (b) is a side view.
Figure 4:
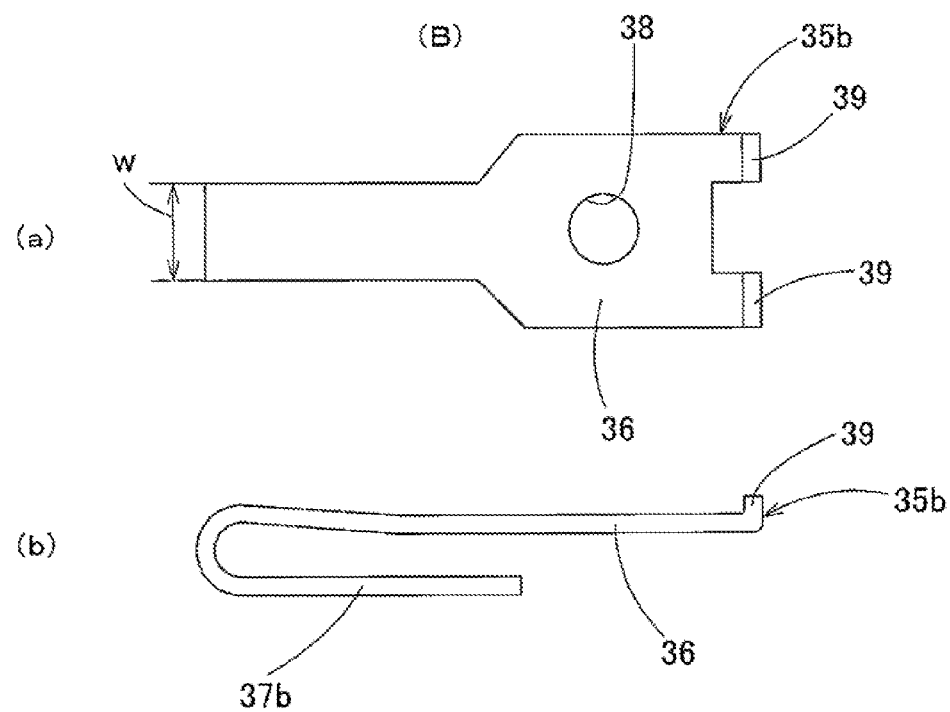

For example, in the construction illustrated in FIG. 1 and FIG. 20, it is also possible to achieve this effect by making the friction resistance of the pair of left and right sliding plates 33a (33b) different from each other. Therefore, in a fourth embodiment of the present invention, the friction coefficient of the sliding plate located on the side near the electric motor is less than the friction coefficient of the sliding plate located on the far side. In order to accomplish this, for example, a synthetic resin that slides easily, such as PTFE, is coated over the surface of a metal plate such as a stainless steel plate as the sliding plate on the side close to the electric motor, or the entire sliding plate is made of a synthetic resin that slides easily, and a simple corrosion resistant metal plate with no such coating layer is used as the sliding plate located on the far side. In the definition of the present invention, this sliding plate is also included in members that are located between the installation plate section and a portion that is fastened to the vehicle body and connected and fastened to both of these sections.

The first through fourth embodiments, in addition to being embodiment separately can be combined. For example, the construction of the second embodiment illustrated in FIGS. 6A, 6B and FIGS. 7A, 7B can be combined with the construction of the third embodiment illustrated in FIGS. 8A, 8B.

Embodiment 5

As illustrated in FIGS. 1 to 3 and FIG. 20, in the case of construction where the bracket 10c on the column side and the bracket 32 on the housing side are supported by a portion that is fastened to the vehicle body such that they can displace in the forward direction due to impact energy during a secondary collision, as illustrated in the figures, it is sufficient to change the characteristic of the pair of left and right installation plate sections dropping away toward the front for only the side of the bracket 10c on the column side. In other words, it is not absolutely necessary to change the characteristic of the pair of left and right installation plate sections dropping away toward the front located on the bracket 32 on the housing side.

However, in this fifth embodiment, this characteristic is made different between the left and right for the bracket 32 on the housing side in addition to the bracket 10c on the column side. Even by only changing the characteristic above between the left and right for the bracket 32 on the housing side, it is possible to obtain construction that is better at protecting the driver than the conventional construction. However, when compared with the making this characteristic different between the left and right for the bracket 10c on the column side, there is a disadvantage in that tuning becomes more difficult when employed alone, so in the present invention, the first through fourth embodiments can be employed individually or combined for both the bracket 10 on the column side and the bracket 32 on the housing side.

INDUSTRIAL APPLICABILITY

The present invention can be widely used in a steering apparatus for an automobile, and more specifically in an impact absorbing steering apparatus that, during a collision accident, allows the steering wheel to displace in the forward direction while absorbing impact energy that is applied to the steering wheel from the body of the driver, and more particularly to an impact absorbing steering apparatus having construction wherein the electric motor of an electric power steering apparatus is provided such that it protrudes from one side in a portion that displaces in the forward direction together with the steering wheel.

EXPLANATION OF REFERENCE NUMBERS

1 Steering wheel
2 Steering gear unit
3 Input shaft
4 Tie rod
5, 5a Steering shaft
6, 6a, 6b, 6c Steering column
7 Universal joint
8 Intermediate shaft
9 Universal joint
10, 10a, 10b, 10c Bracket on the column side
11 Held wall sections
12, 12a Bracket on the vehicle side
13, 13a Electric motor
14, 14a Housing
15 Top plate
16a, 16b Side plate
17, 17a, 17b, 17c, 17d Installation plate section
18, 18a, 18b Cut out section
19, 19a, 19b Capsule
20 Concave section
21 Small through hole
22 Small through hole
23 Through hole
24 Nut
25, 25a Energy absorbing member
26 Bolt
27 Bent back base section
28 Front end side bent back section
29 Straight section
30 Flat plate section
31 Through hole
32 Bracket on the housing side
33a, 33b Sliding plate
34 Bolt
35a, 35b, 35c Energy absorbing member
36 Base plate section
37a, 37b, 37c Plastically deforming section
38 Circular hole
39 Restraining piece
40a, 40b Energy absorbing member
41 Base section
42 Plastically deforming section
43 Hanging down section
44a, 44b Small through hole
45 Anchor plate section

The invention claimed is:

1. An impact absorbing steering apparatus, comprising:
a steering column;
a steering shaft that is supported on the inside of the steering column such that it rotates freely, and is capable of supporting and fastening to a steering wheel on the rear end section that protrudes from the opening on the rear end of the steering column;
a bracket on the column side that comprises a pair of installation plate sections that protrude toward both the left and right sides of the steering column and that are supported by a portion that is fastened to a vehicle body such that these installation plate sections drop away toward the front due to an impact load in the forward direction, and is supported by the steering column and supported by the vehicle body such that displacement in the axial direction together with the steering column is possible; and
an electric power steering apparatus that comprises a housing that is supported by the front end section of the steering column, and an electric motor that protruded to one side from this housing, and that, with this electric motor as a power source, applies an auxiliary torque for the rotation of the steering shaft; wherein
the load required for the pair of installation plate sections to drop away toward the front from the portion fastened to the vehicle body is smaller for the installation plate section on the side near the electric motor than for the installation plate section on the side far from the electric motor.

2. The impact absorbing steering apparatus according to claim 1 comprising members that are located between the installation plate sections and a portion that is fastened to the vehicle body, and that are connected and fastened to both of these; the rigidity or the friction coefficient of these members being different on the side that is far from the electric motor and the side that is near the electric motor.

3. The impact absorbing steering apparatus according to claim 1, comprising a pair of energy absorbing members between the installation plate sections and a portion fastened to the vehicle body, each of the members having plastically deforming sections that are each formed by bending a plastically deformable metal plate such that these energy absorbing members plastically deform when the installation plate sections drop away toward the front, allowing these installation plate sections to displace in the forward direction; wherein the width dimension of the plastically deforming sections of these energy absorbing members is less for the energy absorbing member on the side near the electric motor than for the energy absorbing member on the side far from the electric motor.

4. The impact absorbing steering apparatus according to claim 1, comprising a pair of energy absorbing members between the installation plate sections and a portion fastened to the vehicle body, each of the members having plastically deforming sections that are each formed by bending a plastically deformable metal plate such that these energy absorbing members plastically deform when the installation plate sections drop away toward the front, allowing these installation plate sections to displace in the forward direction; wherein the thickness dimension of the plastically deforming sections of these energy absorbing members is less for the energy absorbing member on the side near the electric motor than for the energy absorbing member on the side far from the electric motor.

5. The impact absorbing steering apparatus according to claim 1, wherein
the installation plate sections comprise cut out sections that open at the rear end edges of the installation plate sections;
the portion fastened to the vehicle body comprises capsules that are supported by this portion such that the displacement in the forward direction is prevented even when an impact load is applied to this portion, and that are fastened to the installation plate sections arranged inside the respective cut out sections such that they can come out from the cut out sections toward the rear when an impact load is applied to these installation plate sections;
there is a pair of energy absorbing members that are located between the capsules and the installation plate sections, and that are each formed by bending plastically deformable wires such that these wires elongate when an impact load is applied to the installation plate sections, allowing the installation plate sections to displace in the forward direction; and of the wires of these energy absorbing members, the wire on the side near the electric motor is thinner than the wire on the side far from the electric motor.

6. The impact absorbing steering apparatus according to claim 1, wherein the installation plate sections comprise cut out sections that open at the rear end edges of these installation plate sections, and locking sections on the displacing side;

the portion fastened to the vehicle body comprise capsules that are provided with locking sections on the fastened side and that are supported by this portion arranged inside the respective cut out sections such that the displacement in the forward direction is prevented even when an impact load is applied to this portion;

there are shear pins that span between the locking section on the displacing side and the locking sections on the fastened side, and these shear pins lock the capsules to the installation plate sections such that the capsules are capable of coming out from the cut out sections toward the rear when an impact load is applied to these installation plate sections; and the shear pins on the side near the electric motor shear more easily than the shear pins on the side far from the electric motor.

7. The impact absorbing steering apparatus according to claim 6, wherein the shear pins on the side near the electric motor are thinner than the shear pins on the side far from the electric motor.

8. The impact absorbing steering apparatus according to claim 6, wherein the shearing resistance of the material of the shear pins on the side near the electric motor is less than the shearing resistance of the material of the shear pins on the side far from the electric motor.

9. The impact absorbing steering apparatus according to claim 1, wherein between both the top and bottom surfaces of the installation plate sections, and the bottom surface of the portion fastened to the vehicle body and the top surface of a restraining member that presses the installation plate sections to the portion fastened to the vehicle body, there is a pair of sliding plates for reducing the friction required for causing these surfaces facing to each other to displace, and of these sliding plates, the friction coefficient of the sliding plate that is on the side near the electric motor is less than the friction coefficient of the sliding plate that is on the side far from the electric motor.

10. The impact absorbing steering apparatus according to claim 1, comprising:

a pair of front side installation plate sections that protrude toward both the left and right of the steering column, and that are supported to a portion that is fastened to the vehicle body such that these front side installation plate sections can drop away toward the front due to an impact load that is applied in the forward direction; and a bracket on the housing side that is supported by the housing, and together with this housing is supported by the vehicle body such that the displacement in the axial direction is possible; wherein the load required for the front side installation plate sections to drop away from the portion fastened to the vehicle body is less on the side near the electric motor than the side far from the electric motor.

11. The impact absorbing steering apparatus according to claim 10, comprising members that are located between the front side installation plate sections and the portion that is fastened to the vehicle body, and are connected and fastened to both of these, wherein the rigidity or friction coefficient of these members is different between the side far from the electric motor and on the side near the electric motor.

* * * * *